United States Patent [19]
Fielder

[11] Patent Number: 5,357,594
[45] Date of Patent: Oct. 18, 1994

[54] ENCODING AND DECODING USING SPECIALLY DESIGNED PAIRS OF ANALYSIS AND SYNTHESIS WINDOWS

[75] Inventor: Louis D. Fielder, Millbrae, Calif.

[73] Assignee: Dolby Laboratories Licensing Corporation, San Francisco, Calif.

[21] Appl. No.: 78,594

[22] Filed: Jun. 16, 1993

Related U.S. Application Data

[60] Division of Ser. No. 582,956, Sep. 26, 1990, Pat. No. 5,222,189, which is a continuation-in-part of Ser. No. 439,868, Nov. 20, 1989, abandoned, which is a continuation-in-part of Ser. No. 303,714, Jan. 27, 1989, abandoned.

[51] Int. Cl.$^5$ .............................................. G10L 3/02
[52] U.S. Cl. ..................... 395/2.2; 395/2.14; 395/2.38; 395/2.39
[58] Field of Search .............. 395/2.2, 2.14, 2.38, 395/2.39, 2.29, 2.12; 364/724.01; 381/29-37

[56] References Cited

PUBLICATIONS

Hamming, Digital Filters, Chapters 5 & 9, 1973, Prentice-Hall, pp. 90-108 and 167-187.
Musmann, "The ISO Coding Standard," Globecom '90, IEEE Global Telecommunications Conference & Exhibition, San Diego, Calif., Dec. 2-5, 1990, pp. 511-517.
F. J. Harris, "On the Use of Windows for Harmonic Analysis with the Discrete Fourier Transform," Jan. 1978, pp. 51-83, Proc. of the IEEE vol. 66, No. 1.
K. M. M. Prabhu, et al., "Optimised Data Windows," Jan. 1980, pp. 38-40, Electronics Letters, vol. 16, No. 1.
B. Feiten, "Spectral Properties of Audio Signals and Masking with Aspect to Bit Data Reduction," Mar. 1989, pp. 1-18, 86th Convention, Hamburg, Germany, AES (Audio Engineering Society).
T. Lookabaugh, et al., "Application of the Princen-Bradley Filter Bank to Speech and Image Compression," Apr. 1989, NASA contracts NAGW-419 and NCC-2-307.

Primary Examiner—David D. Knepper
Attorney, Agent, or Firm—Thomas A. Gallagher; David N. Lathrop

[57] ABSTRACT

The invention relates to the design of analysis and synthesis windows for use in high-quality transform encoding and decoding of audio signals, especially encoding and decoding having a short signal-propagation delay. The design method derives a pair of analysis/synthesis windows from a known window function which satisfy various filter selectivity and window overlap-add constraints.

20 Claims, 13 Drawing Sheets

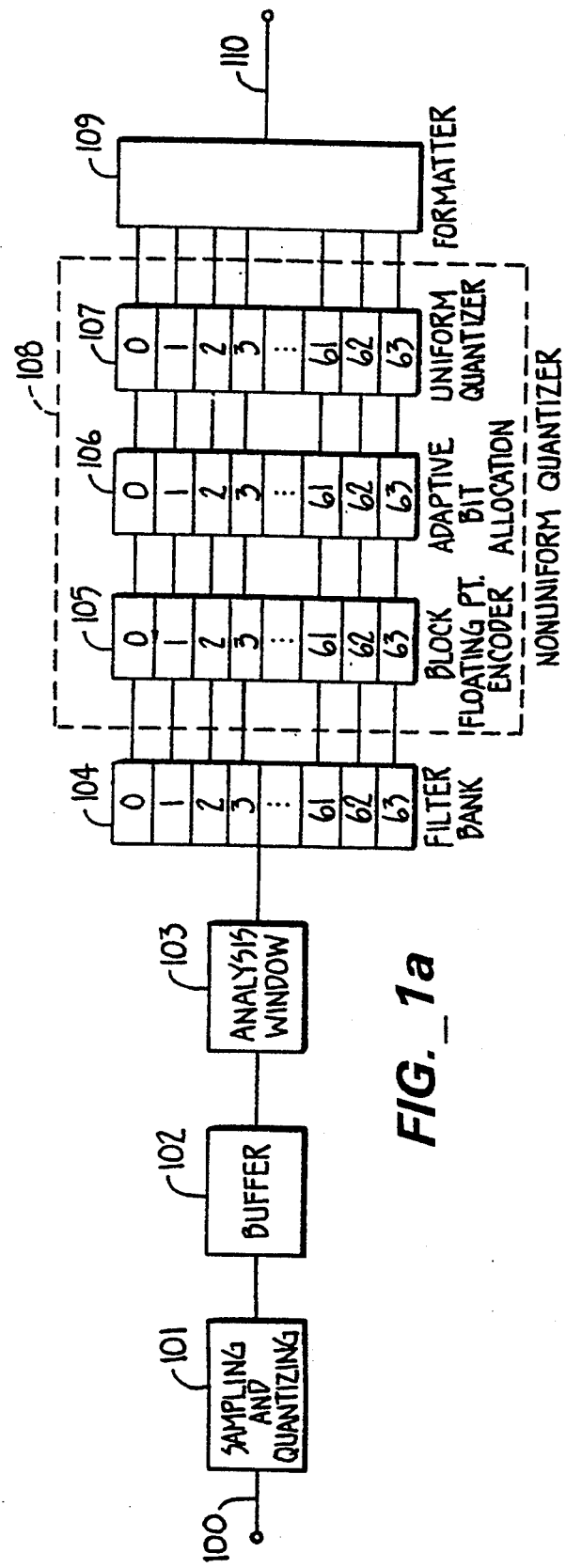
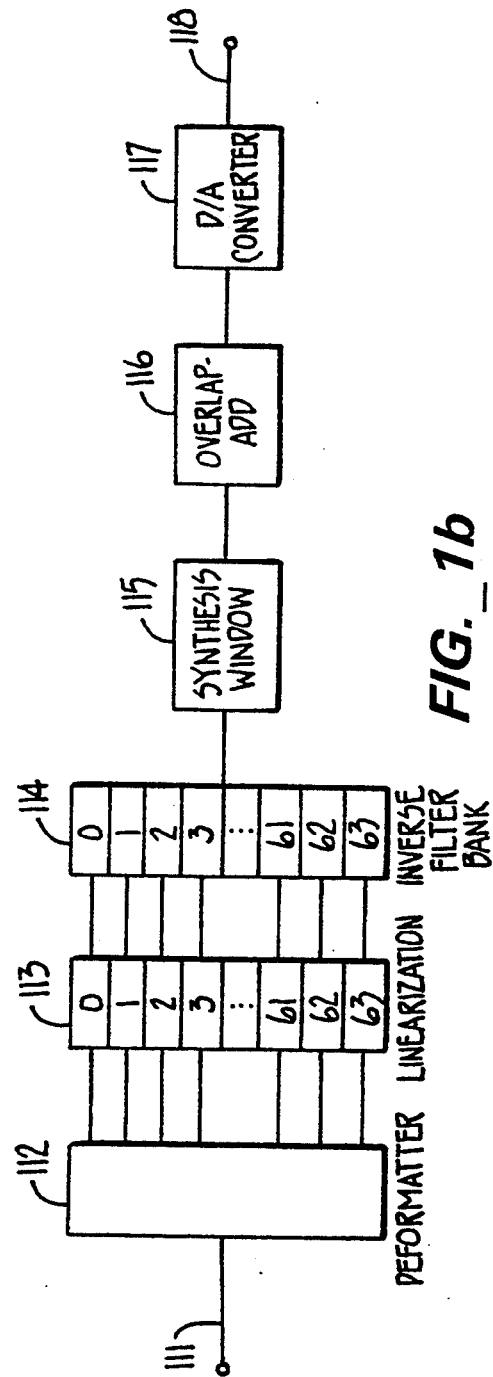
FIG. 1a
FIG. 1b

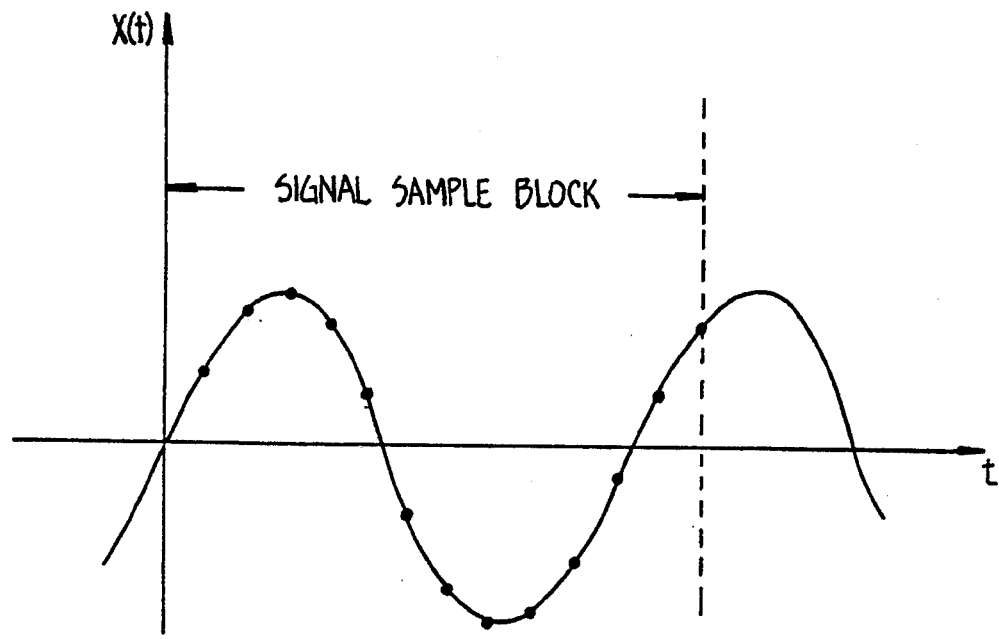
FIG. _2
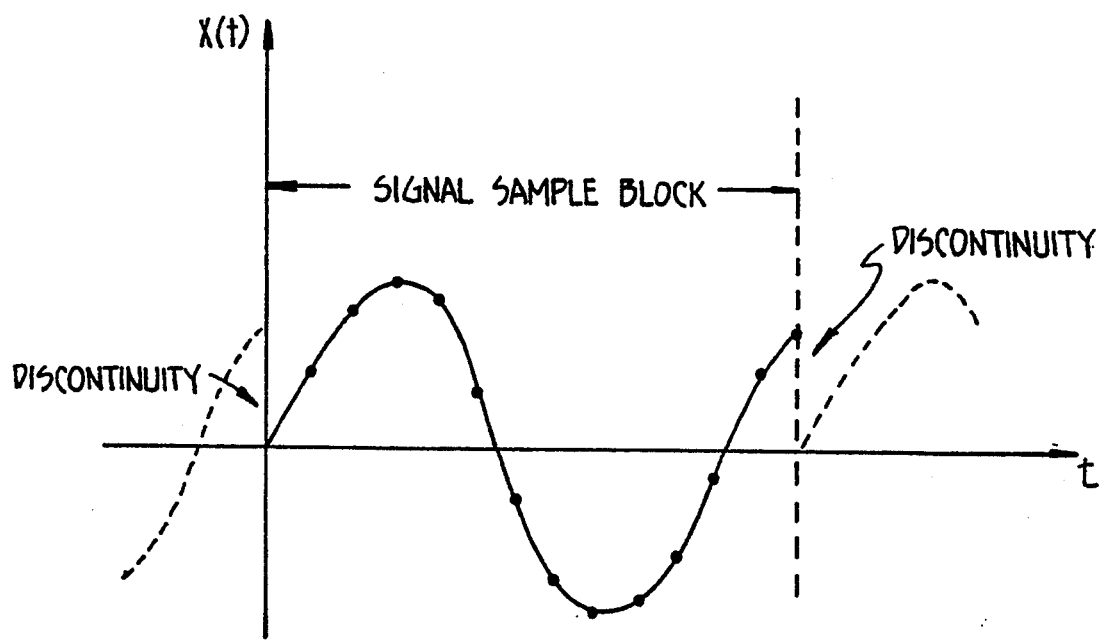
FIG. _3

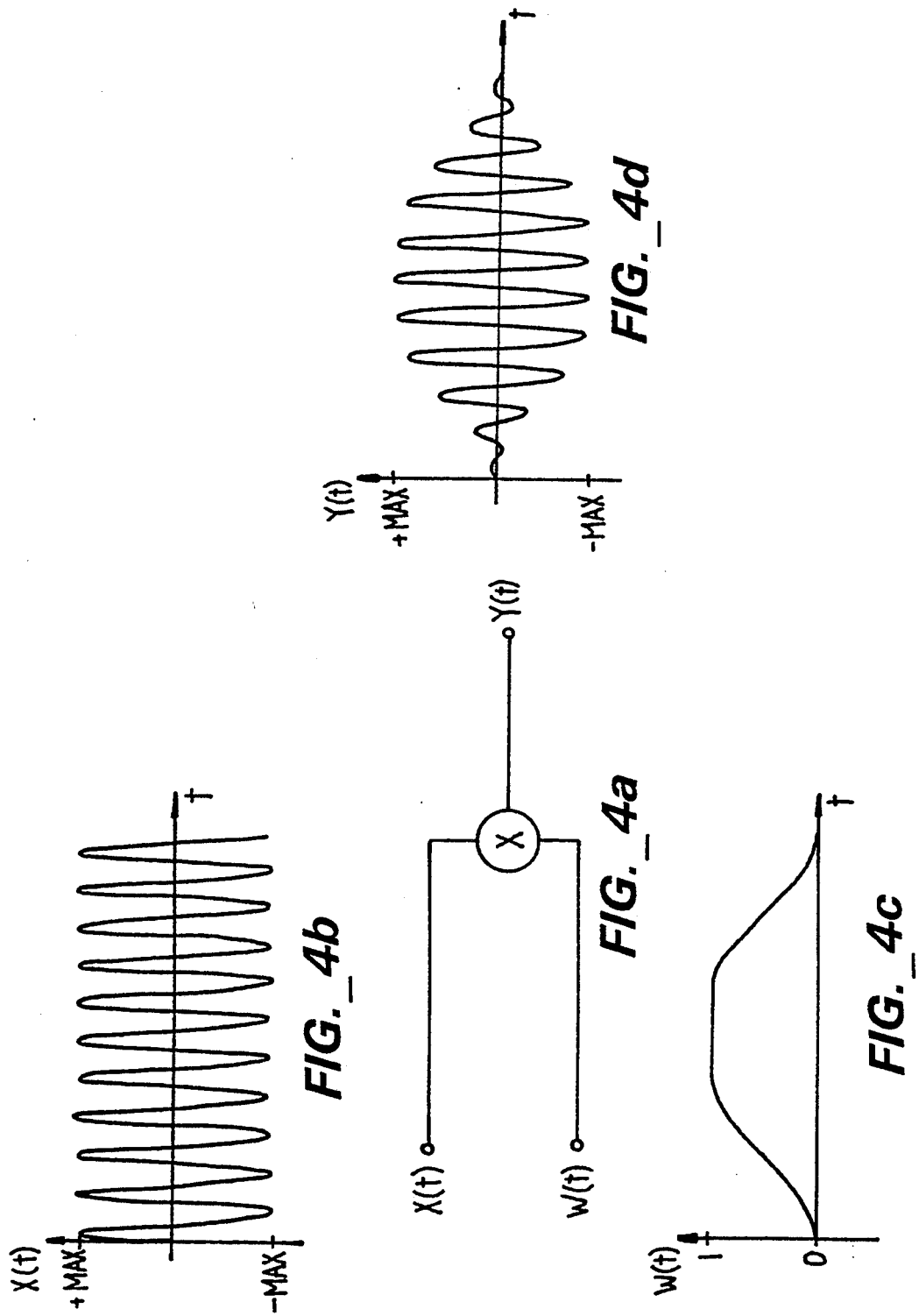

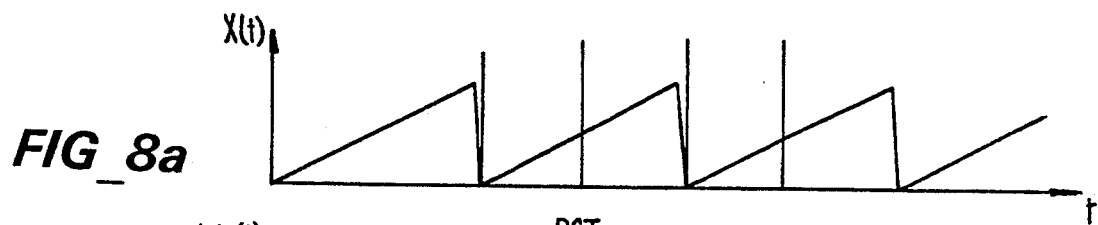
FIG_8a
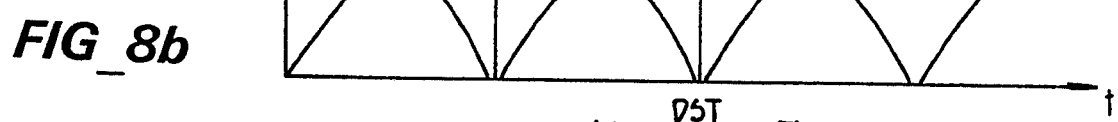
FIG_8b
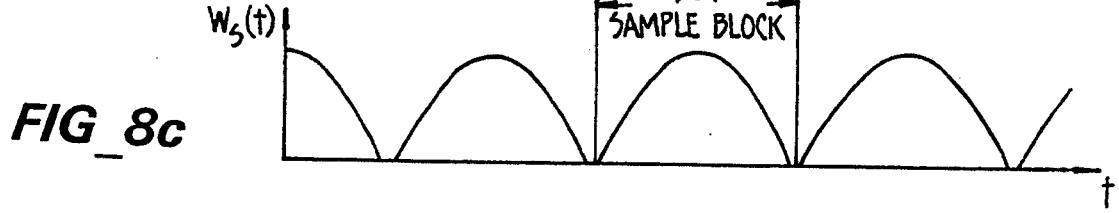
FIG_8c
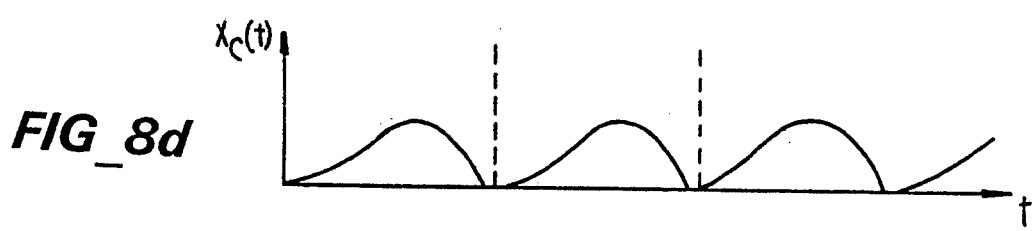
FIG_8d
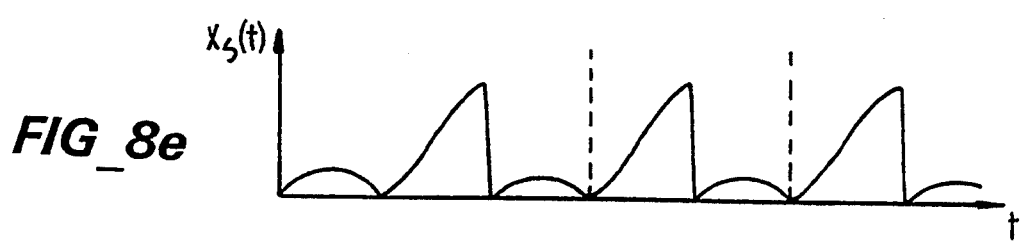
FIG_8e

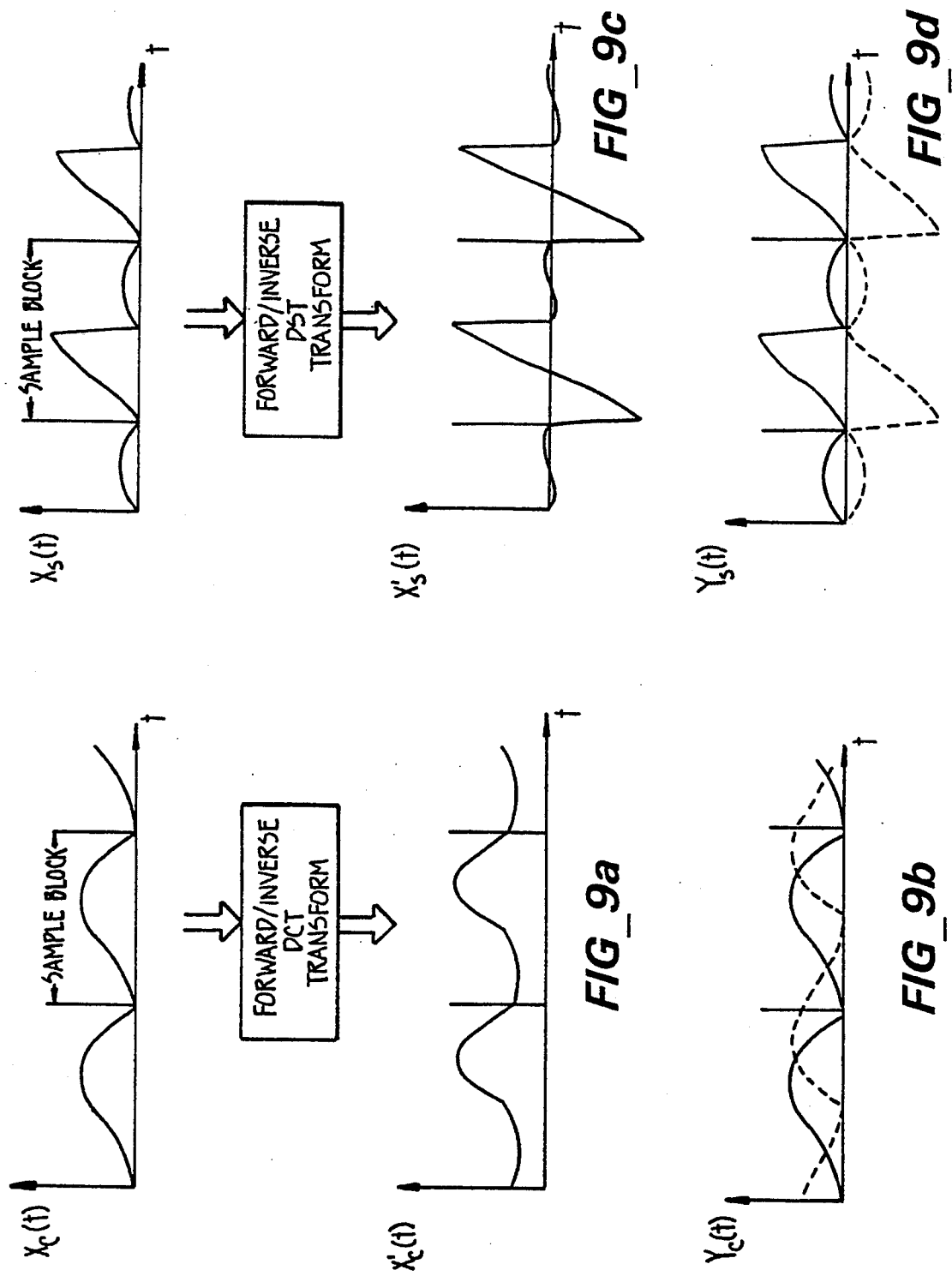

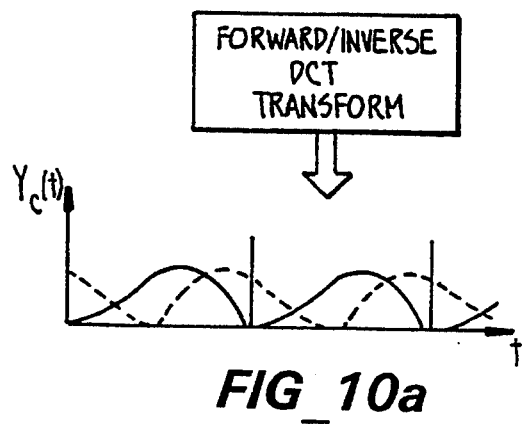
FIG_10a
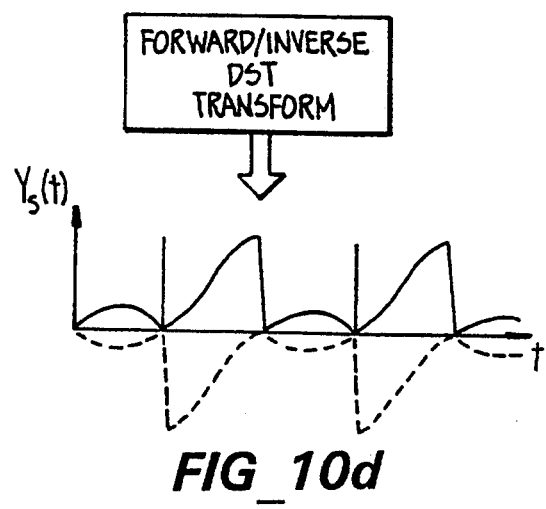
FIG_10d
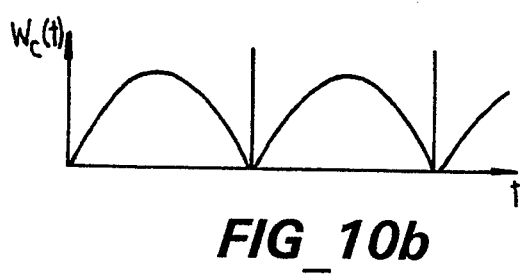
FIG_10b
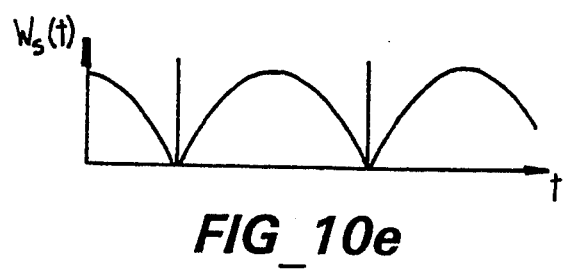
FIG_10e
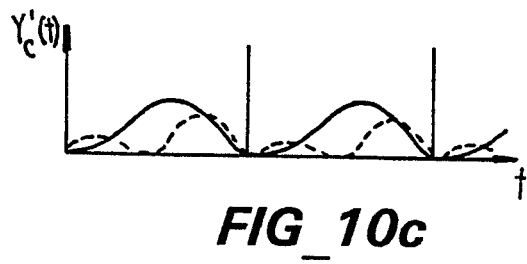
FIG_10c
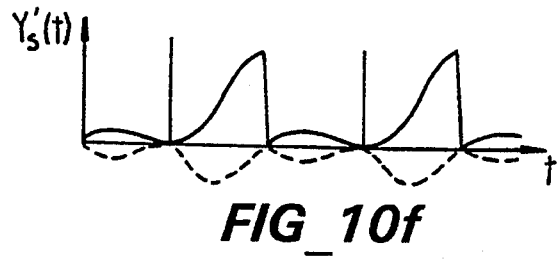
FIG_10f
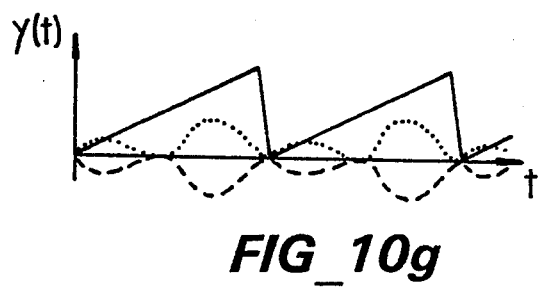
FIG_10g

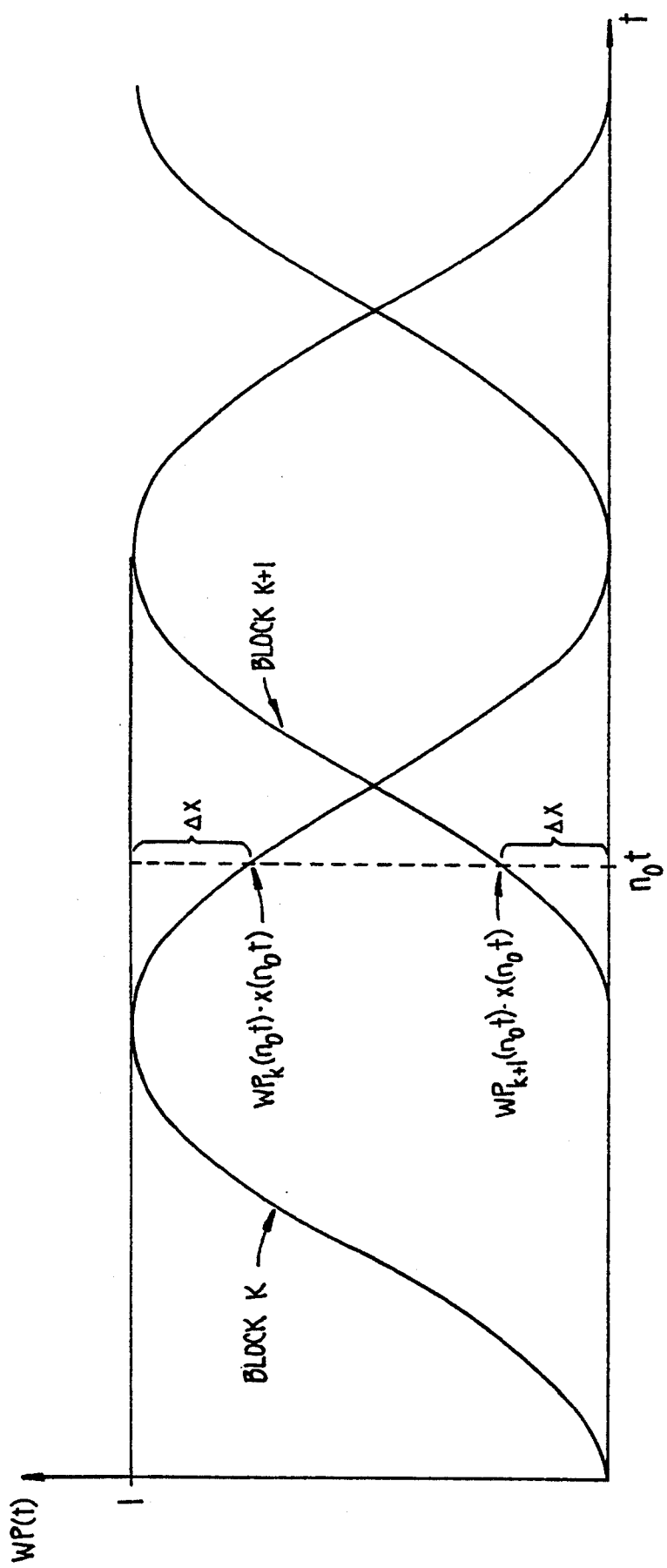
FIG._12

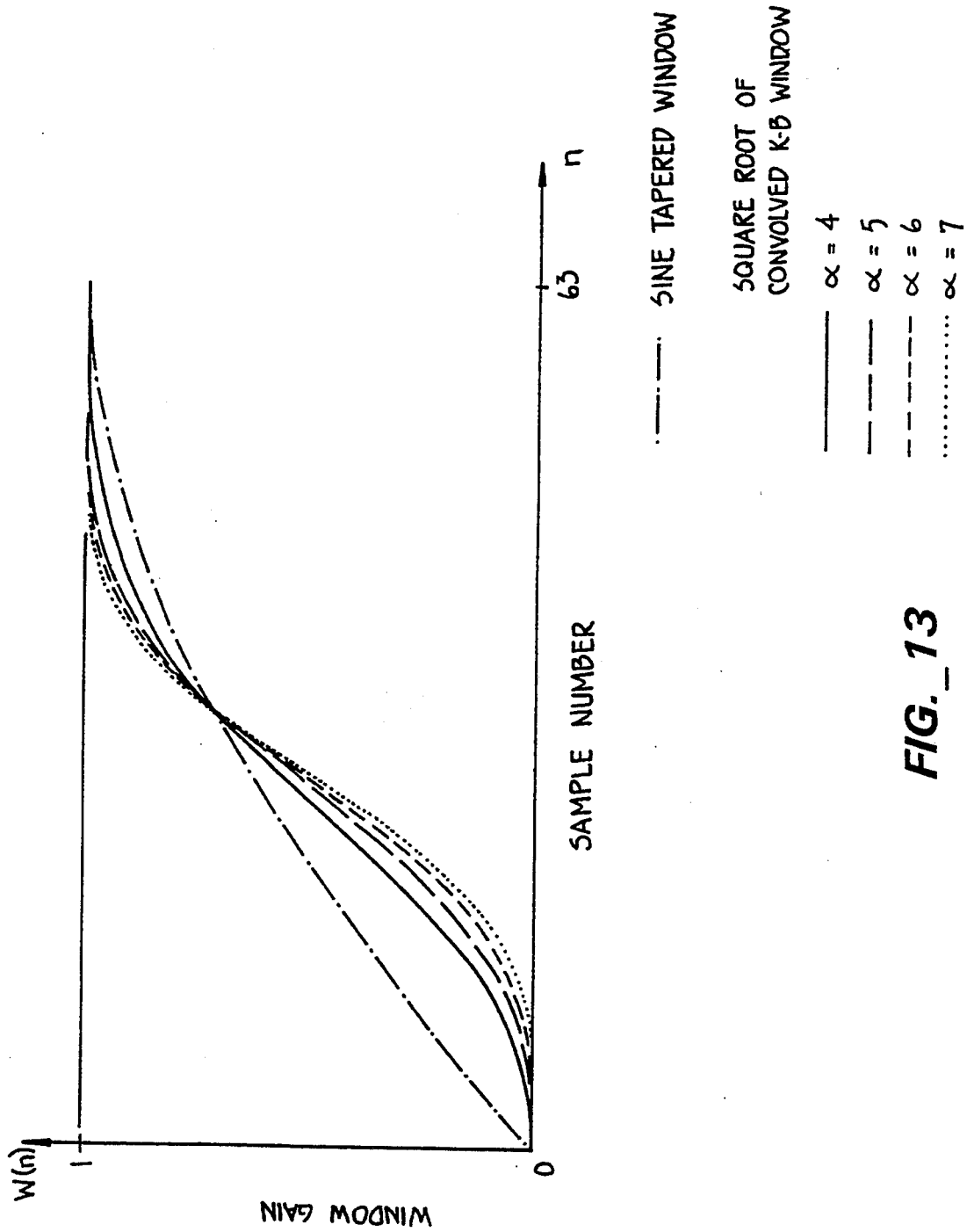
FIG._13

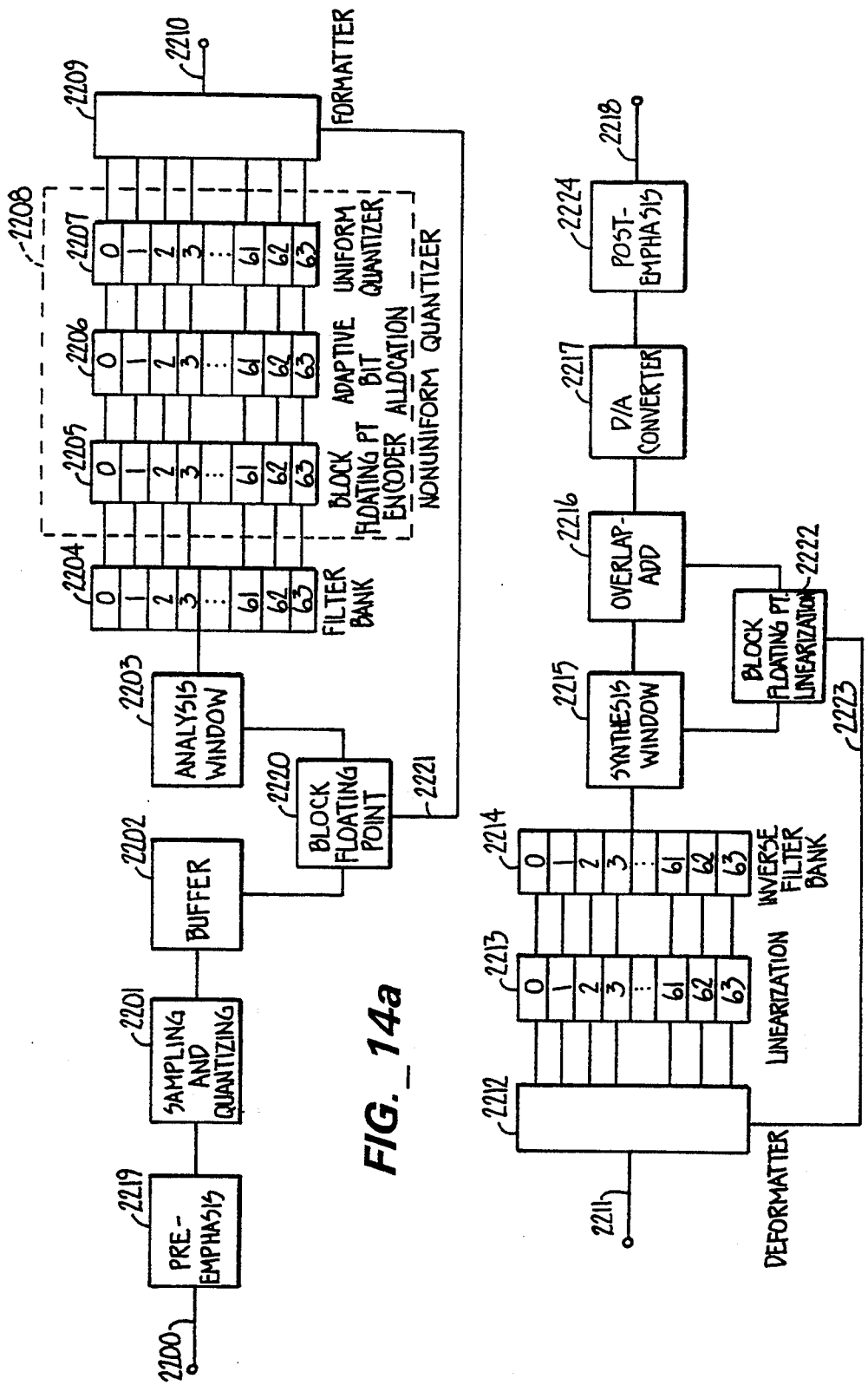
FIG. _ 14a
FIG. _ 14b

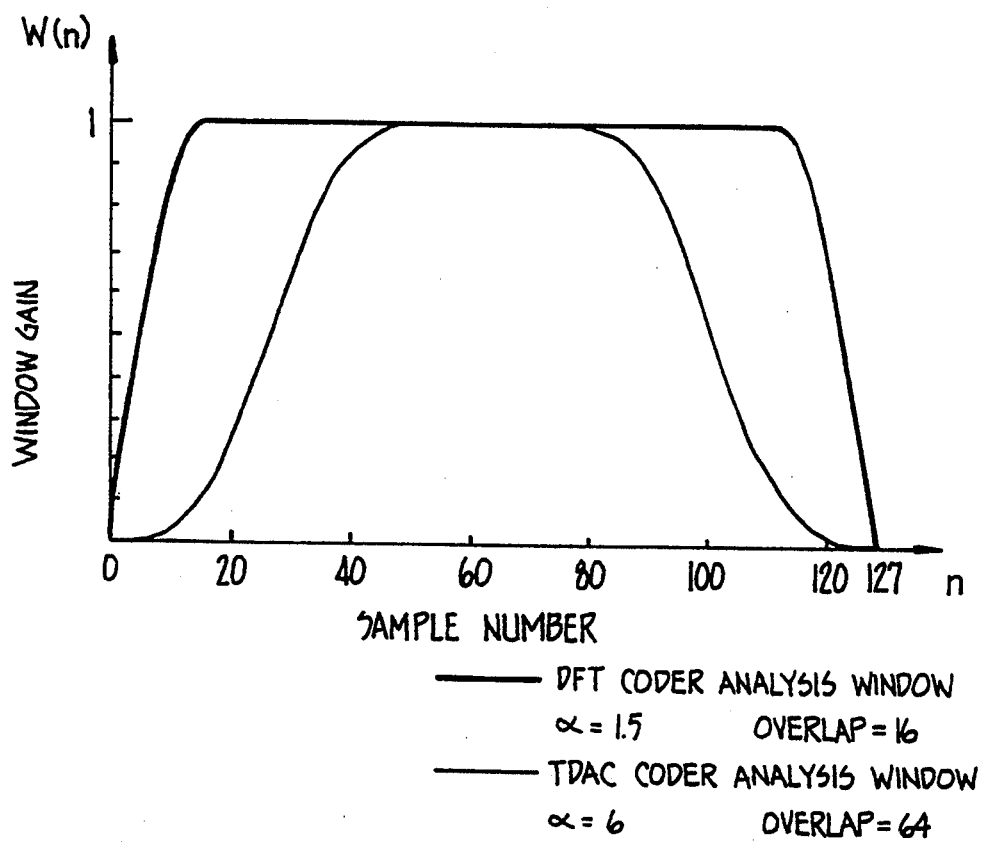
FIG._15
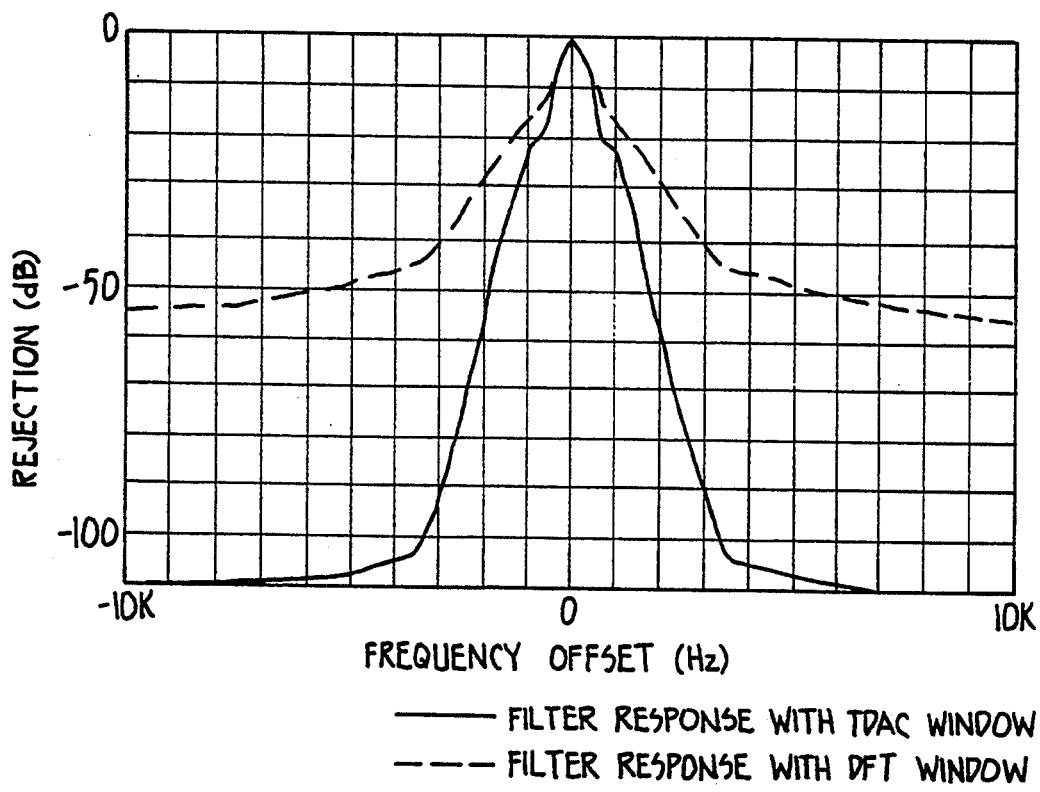
FIG._16

ENCODING AND DECODING USING SPECIALLY DESIGNED PAIRS OF ANALYSIS AND SYNTHESIS WINDOWS

CROSS-REFERENCE INFORMATION

This application is a division of copending application Ser. No. 07/582,956 filed Sep. 26, 1990, now in issue as U.S. Pat. No. 5,222,189, which is a continuation-in-part of application Ser. No. 07/439,868 filed Nov. 20, 1989, now abandoned, which was a continuation-in-part of application Ser. No. 07/303,714 filed Jan. 27, 1989, now abandoned.

TECHNICAL FIELD

The invention relates in general to the high-quality low bit-rate digital signal processing of audio signals, such as music signals. More particularly, the invention relates to analysis and synthesis windows used in transform encoders and decoders for such signals, especially encoders and decoders having a short signal-propagation delay. Short delays are important in applications such as broadcast audio where a speaker must monitor his own voice. A delay in voice feedback causes serious speech disruption unless the delay is very short.

BACKGROUND ART

INTRODUCTION

Transform coding of high-quality signals in the prior art have used long signal sample block lengths to achieve low bit-rate coding without creating objectionable audible distortion. For example, a transform coder disclosed in EP 0 251 028 uses a block length of 1024 samples. Long block lengths have been necessary because shorter blocks degrade transform coder selectivity. Filter selectivity is critical because transform coders with sufficient filter bank selectivity can exploit psychoacoustic masking properties of human hearing to reduce bit-rate requirements without degrading the subjective quality of the coded signal.

Coders using long block lengths stiffer from two problems: (1) audible distortion of signals with large transients caused by the temporal spreading of the transient's effects throughout the transform block, and (2) excessive propagation delay of the signal through the encoding and decoding process. In prior art coders, these processing delays are too great for applications such as broadcast audio where a speaker must monitor his own voice. A delay in voice feedback causes serious speech disruption unless the delay is kept very short.

The background art is discussed in more detail in the following Background Summary.

BACKGROUND SUMMARY

There is considerable interest among those in the field of signal processing to discover methods which minimize the amount of information required to represent adequately a given signal. By reducing required information, signals may be transmitted over communication channels with lower bandwidth, or stored in less space. With respect to digital techniques, minimal informational requirements are synonymous with minimal binary bit requirements.

Two factors limit the reduction of bit requirements:

(1) A signal of bandwidth W may be accurately represented by a series of samples taken at a frequency no less than 2·W. This is the Nyquist sampling rate. Therefore, a signal T seconds in length with a bandwidth W requires at least 2·W·T number of samples for accurate representation.

(2) Quantization of signal samples which may assume any of a continuous range of values introduces inaccuracies in the representation of the signal which are proportional to the quantizing step size or resolution. These inaccuracies are called quantization errors. These errors are inversely proportional to the number of bits available to represent the signal sample quantization.

If coding techniques are applied to the full bandwidth, all quantizing errors, which manifest themselves as noise, are spread uniformly across the bandwidth. Techniques which may be applied to selected portions of the spectrum can limit the spectral spread of quantizing noise. Two such techniques are subband coding and transform coding. By using these techniques, quantizing errors can be reduced in particular frequency bands where quantizing noise is especially objectionable by quantizing that band with a smaller step size.

Subband coding may be implemented by a bank of digital bandpass filters. Transform coding may be implemented by any of several time-domain to frequency-domain transforms which simulate a bank of digital bandpass filters. Although transforms are easier to implement and require less computational power and hardware than digital filters, they have less design flexibility in the sense that each bandpass filter "frequency bin" represented by a transform coefficient has a uniform bandwidth. By contrast, a bank of digital bandpass filters can be designed to have different subband bandwidths. Transform coefficients can, however, be grouped together to define "subbands" having bandwidths which are multiples of a single transform coefficient bandwidth. The term "subband" is used hereinafter to refer to selected portions of the total signal bandwidth, whether implemented by a subband coder or a transform coder. A subband as implemented by transform coder is defined by a set of one or more adjacent transform coefficients or frequency bins. The bandwidth of a transform coder frequency bin depends upon the coder's sampling rate and the number of samples in each signal sample block (the transform length).

Two characteristics of subband bandpass filters are particularly critical to the performance of high-quality music signal processing systems. The first is the bandwidth of the regions between the filter passband and stopbands (the transition bands). The second is the attenuation level in the stopbands. As used herein, the measure of filter "selectivity" is the steepness of the filter response curve within the transition bands (steepness of transition band rolloff), and the level of attenuation in the stopbands (depth of stopband rejection).

These two filter characteristics are critical because the human ear displays frequency-analysis properties resembling those of highly asymmetrical tuned filters having variable center frequencies. The frequency-resolving power of the human ear's tuned filters varies with frequency throughout the audio spectrum. The ear can discern signals closer together in frequency at frequencies below about 500 Hz, but widening as the frequency progresses upward to the limits of audibility. The effective bandwidth of such an auditory filter is referred to as a critical band. An important quality of the critical band is that psychoacoustic-masking effects are most strongly manifested within a critical band—a dominant signal within a critical band can suppress the audibility of other signals anywhere within that critical band. Signals at frequencies outside that critical band are not masked as strongly. See generally, the Audio Engineering Handbook, K. Blair Benson ed., McGraw-Hill, San Francisco, 1988, pages 1.40–1.42 and 4.8–4.10.

Psychoacoustic masking is more easily accomplished by subband and transform coders if the subband bandwidth throughout the audible spectrum is about half the critical bandwidth of the human ear in the same portions of the spectrum. This is because the critical bands of the human ear have variable center frequencies that adapt to auditory stimuli, whereas subband and transform coders typically have fixed subband center frequencies. To optimize the opportunity to utilize psychoacoustic-masking effects, any distortion artifacts resulting from the presence of a dominant signal should be limited to the subband containing the dominant signal. If the subband bandwidth is about half or less than half of the critical band (and if the transition band rolloff is sufficiently steep and the stopband rejection is sufficiently deep), the most effective masking of the undesired distortion products is likely to occur even for signals whose frequency is near the edge of the subband passband bandwidth. If the subband bandwidth is more than half a critical band, there is the possibility that the dominant signal will cause the ear's critical band to be offset from the coder's subband so that some of the undesired distortion products outside the ear's critical bandwidth are not masked. These effects are most objectionable at low frequencies where the ear's critical band is narrower.

Transform coding performance depends upon several factors, including the signal sample block length, transform coding errors, and aliasing cancellation.

Block Length

Inasmuch as the transform function must wait for the receipt of all signal samples in the entire block before performing the transform, the fastest theoretical time delay in an encode/decode system is twice the time period of the signal sample block. In practical systems, computation adds further delays such that the actual time delay is likely to be three or four times the time period of the signal sample block. If the encode/decode system must operate in an environment requiring a short propagation delay, a short block length is therefore required.

As block lengths become shorter, transform encoder and decoder performance is adversely affected not only by the consequential widening of the frequency bins, but also by degradation of the response characteristics of the bandpass filter frequency bins: (1) decreased rate of transition band rolloff, and (2) reduced level of stopband rejection. This degradation in filter performance results in the undesired creation of or contribution to transform coefficients in nearby frequency bins in response to a desired signal. These undesired contributions are called sidelobe leakage.

Thus, depending on the sampling rate, a short block length may result in a nominal filter bandwidth exceeding the ear's critical bandwidth at some or all frequencies, particularly low frequencies. Even if the nominal subband bandwidth is narrower than the ear's critical bandwidth, degraded filter characteristics manifested as a broad transition band and/or poor stopband rejection may result in significant signal components outside the ear's critical bandwidth. In such cases, greater constraints are ordinarily placed on other aspects of the system, particularly quantization accuracy.

Another disadvantage resulting from short sample block lengths is the exacerbation of transform coding errors, described in the next section.

Transform Coding Errors

Discrete transforms do not produce a perfectly accurate set of frequency coefficients because they work with only a finite segment of the signal. Strictly speaking, discrete transforms produce a time-frequency representation of the input time-domain signal rather than a true frequency-domain representation which would require infinite transform lengths. For convenience of discussion here, however, the output of discrete transforms will be referred to as a frequency-domain representation. In effect, the discrete transform assumes the sampled signal only has frequency components whose periods are a submultiple of the finite sample interval. This is equivalent to an assumption that the finite-length signal is periodic. The assumption in general is not true. The assumed periodicity creates discontinuities at the edges of the finite time interval which cause the transform to create phantom high-frequency components.

One technique which minimizes this effect is to reduce the discontinuity prior to the transformation by weighting the signal samples such that samples near the edges of the interval are close to zero. Samples at the center of the interval are generally passed unchanged, i.e., weighted by a factor of one. This weighting function is called an "analysis window" and may be of any shape, but certain windows contribute more favorably to subband filter performance.

As used herein, the term "analysis window" refers merely to the windowing function performed prior to application of the forward transform. As will be discussed below, the design of an analysis window used in a preferred embodiment of an encoder/decoder system is constrained by synthesis window design considerations. Therefore, design and performance properties of an "analysis window" as that term is commonly used in the art may differ from such analysis windows as designed according to the teachings of the present invention. While there is no single criteria which may be used to assess a window's quality, general criteria include steepness of transition band rolloff and depth of stopband rejection. In some applications, the ability to trade steepness of rolloff for depth of rejection level is a useful quality.

The analysis window is a time-domain function. If no other compensation is provided, the recovered or "synthesized" signal will be distorted according to the shape of the analysis window. There are several compensation methods. For example:

(a) The recovered signal interval or block may be multiplied by an inverse window, one whose weighting factors are the reciprocal of those for the analysis window. A disadvantage of this technique is that it clearly requires that the analysis window not go to zero at the edges.

(b) Consecutive input signal blocks may be overlapped. By carefully designing the analysis window such that two adjacent windows add to unity across the overlap, the effects of the window will be exactly compensated. (But see the following paragraph.) When used with certain types of transforms such as the Discrete Fourier Transform (DFT), this technique increases the number of bits required to represent the signal since the portion of the signal in the overlap interval must be transformed and transmitted twice. For these types of transforms, it is desirable to design the window with an overlap interval as small as possible.

(c) The synthesized output from the inverse transform may also need to be windowed. Some transforms, including one used in a preferred embodiment of a decoder, require it. Further, quantizing errors may cause the inverse transform to produce a time-domain signal which does not go to zero at the edges of the finite time interval. Left alone, these errors may distort the recovered time-domain signal most strongly within the window overlap interval. A synthesis window can be used to shape each synthesized signal block at its edges. In this case, the signal will be subjected to an analysis and a synthesis window, i.e., the signal will be weighted by the product of the two windows. Therefore, both windows must be designed such that the product of the two will sum to unity across the overlap. See the discussion in the previous paragraph. Short transform sample blocks impose greater compensation requirements on the analysis and synthesis windows. As the transform sample blocks become shorter there is more sidelobe leakage through the filter's transition band and stopband. A well shaped analysis window reduces this leakage.

Sidelobe leakage is undesirable because it causes the transform to create spectral coefficients which misrepresent the frequency of signal components outside the filter's passband. This misrepresentation is a distortion called aliasing.

Aliasing Cancellation

The Nyquist theorem holds that a signal may be accurately recovered from discrete samples when the interval between samples is no larger than one-half the period of the signal's highest frequency component. When the sampling rate is below this Nyquist rate, higher-frequency components are misrepresented as lower-frequency components. The lower-frequency component is an "alias" for the true component.

Subband filters and finite digital transforms are not perfect passband filters. The transition between the passband and stopband is not infinitely sharp, and the attenuation of signals in the stopband is not infinitely great. As a result, even if a passband-filtered input signal is sampled at the Nyquist rate suggested by the passband cut-off frequency, frequencies in the transition band above the cutoff frequency will not be faithfully represented.

It is possible to design the analysis and synthesis filters such that aliasing distortion is automatically cancelled by the synthesis filter. Quadrature Mirror Filters in the time domain possess this characteristic. Some transform techniques, including one used in a preferred embodiment of an encoder or decoder incorporating a window function designed according to the present invention, also cancel alias distortion.

Suppressing the audible consequences of aliasing distortion in transform coders becomes more difficult as the sample block length is made shorter. As explained above, shorter sample blocks degrade filter performance: the passband bandwidth increases, the passband-stopband transition becomes less sharp, and the stopband rejection deteriorates. As a result, aliasing becomes more pronounced. If the alias components are coded and decoded with insufficient accuracy, these coding errors prevent the inverse transform from completely cancelling aliasing distortion. The residual aliasing distortion will be audible unless the distortion is psychoacoustically masked. With short sample blocks, however, some transform frequency bins may have a wider passband than the auditory critical bands, particularly at low frequencies where the ear's critical bands have the greatest resolution. Consequently, alias distortion may not be masked. One way to minimize the distortion is to increase quantization accuracy in the problem subbands, but that increases the required bit rate.

Bit-rate Reduction Techniques

The two factors listed above (Nyquist sample rate and quantizing errors) should dictate the bit-rate requirements for a specified quality of signal transmission or storage. Techniques may be employed, however, to reduce the bit rate required for a given signal quality. These techniques exploit a signal's redundancy and irrelevancy. A signal component is redundant if it can be predicted or otherwise provided by the receiver. A signal component is irrelevant if it is not needed to achieve a specified quality of representation.

A variety of bit-rate reduction techniques are well known in the art, but no particular technique is critical to the practice of the present invention. Several techniques used in the art, such as adaptive bit allocation, are summarized in U.S. Pat. No. 5,222,189, which is hereby incorporated by reference in its entirety. An embodiment of adaptive bit allocation is discussed therein.

Disclosure of Invention

It is an object of the present invention to provide for the digital processing of wideband audio information, particularly music, using an encode/decode apparatus and method having a signal propagation delay short enough as to be usable for real-time aural feedback to a human operator.

It is a further object of the present invention to provide for such an encode/decode apparatus and method suitable for the high-quality transmission or storage and reproduction of music, wherein the quality of reproduction is suitable, for example, for broadcast audio links.

It is a further object of the present invention to provide for a quality of reproduction subjectively as good as that obtainable from Compact Discs.

Yet a further object of the present invention is to provide for an encode/decode apparatus and method embodied in a digital processing system having a short signal propagation delay but which provides the high quality reproduction of music while employing a low bit rate.

Yet another object of the present invention is to compensate for the negative effects on transform coder performance resulting from the use of short transform blocks.

Further details of the above objects and still other objects of the present invention are set forth throughout this document, particularly in the section describing the Modes for Carrying Out the Invention, below.

In one embodiment of a transform encoder incorporating an analysis window designed in accordance with the teachings of the present invention, wideband audio signals are sampled and quantized into time-domain sample blocks, the sample blocks having a time period resulting in a signal propagation delay short enough so that an encode/decode system employing the encoder is usable for real-time aural teed back to a human operator. Each sample block is then modulated by the analysis window. Frequency-domain spectral components are then generated in response to the analysis-window weighted time-domain sample block. A coding function having adaptive bit allocation nonuniformly quantizes each transform coefficient, and those coefficients are assembled into a digital output having a format suitable for storage or transmission. Error correction codes may be used in applications where the transmitted signal is subject to noise or other corrupting effects of the communication path.

In one embodiment of a transform decoder incorporating a synthesis window designed in accordance with the teachings of the present invention, the digital output of an encoder is received via a storage device or transmission path. Nonuniformly quantized spectral components are derived from the formatted digital signal and frequency-domain spectral components are reconstructed therefrom. Time-domain signal sample blocks are generated in response to frequency-domain spectral components by means having characteristics inverse to those of the means in the encoder which generated the frequency-domain spectral components. The sample blocks are modulated by the synthesis window. The synthesis window has characteristics such that the product of the synthesis-window function and the analysis-window function used in the encoder produces a composite function which sums to unity for two adjacent overlapped sample blocks. Adjacent sample blocks are overlapped and added to cancel the weighting effects of the analysis and synthesis windows and to recover a digitized representation of the time-domain signal which is then converted to a high-quality analog output.

In a preferred embodiment of an encoder incorporating an analysis window designed in accordance with the teachings of the present invention, a discrete transform generates frequency-domain spectral components in response to the analysis-window weighted time-domain sample blocks by applying a function equivalent to the alternate application of a modified Discrete Cosine Transform (DCT) and a modified Discrete Sine Transform (DST). In an alternative embodiment, the discrete transform is implemented by a Discrete Fourier Transform (DFT), however, virtually any time-domain to frequency-domain transform can be used.

In preferred embodiments of encoders and decoders incorporating window functions designed in accordance with the teachings of the present invention, the sampling rate is 44.1 kHz. While the sampling rate is not critical, 44.1 kHz is a suitable sampling rate and it is convenient because it is also the sampling rate used for Compact Discs. An alternative embodiment employs a 48 kHz sampling rate. In the preferred embodiment employing the 44.1 kHz sampling rate, the time-domain sample blocks have a length of 128 samples to provide an acceptably low signal-propagation delay so that the system is usable for providing real-time aural feedback to a human operator (such as for broadcast audio). When a person's own voice is returned to his ears after a delay, speech disturbances are created unless the delay is kept very short. See for example "Effects of Delayed Speech Feedback" by Bernard S. Lee, *Journal of the Acoustical Soc. of America*, vol. 22, no. 6, November 1950, pp. 824–826. The overall encode/decode system is assumed to have a delay of about three times the sample block period or about 10 milliseconds (msec) or less which is sufficiently short to overcome speech disturbance problems. In the preferred embodiment, the serial bit rate of the encoder output is in the order of 192 kBits per second (including overhead information such as error correction codes). Other bit rates yielding varying levels of signal quality may be used without departing from the basic spirit of the invention.

The various features of the invention and preferred embodiments of coding apparatuses and methods incorporating window functions designed according to the present invention are set forth in greater detail in the following section describing the Modes for Carrying Out the Invention and in the accompanying drawings.

BRIEF DESCRIPTION OF THE DRAWINGS

FIG. 1a is a functional block diagram illustrating the basic structure of a preferred embodiment of an encoder incorporating an analysis window designed according to the teachings of the present invention for use with a filter bank implemented by the Time Domain Aliasing Cancellation transform technique.

FIG. 1b is a functional block diagram illustrating the basic structure of a preferred embodiment of a decoder incorporating a synthesis window designed according to the teachings of the present invention for use with an inverse filter bank implemented by the Time Domain Aliasing Cancellation transform technique.

FIG. 2 is a hypothetical graphical representation showing a time-domain signal sample block.

FIG. 3 is a further hypothetical graphical representation of a time-domain signal sample block showing discontinuities at the edges of the sample block caused by a discrete transform assuming the signal within the block is periodic.

FIG. 4a is a functional block diagram showing the modulation of a function X(t) by a function W(t) to provide the resulting function Y(t).

FIGS. 4b through 4d are further hypothetical graphical representations showing the modulation of a time-domain signal sample block by an analysis window.

FIGS. 8a through 8e are hypothetical graphical representations illustrating a time-domain signal grouped into a series of overlapped and windowed time-domain signal sample blocks.

FIGS. 9a through 9d are hypothetical graphical representations illustrating the time-domain aliasing distortion created by the TDAC transform.

FIGS. 10a through 10g are hypothetical graphical representations illustrating the cancellation of time-domain aliasing by overlap-add during TDAC transform signal synthesis.

FIG. 12 is a hypothetical graphical representation showing the overlap-add property of adjacent windowed blocks.

FIG. 13 is a hypothetical graphical representation comparing the shape of several convolved Kaiser-Bessel analysis windows for a range of alpha values 4 to 7 with a sine-tapered window.

FIG. 14a is a functional block diagram illustrating the basic structure of a preferred embodiment of an encoder incorporating an analysis window designed according to the teachings of the present invention tier use with a filter bank implemented by an Discrete Fourier Transform.

FIG. 14b is a functional block diagram illustrating the basic structure of a preferred embodiment of a decoder incorporating a synthesis window designed according to the teachings of the present invention for use with an inverse filter bank implemented by an inverse Discrete Fourier Transform.

FIG. 15 is a graphical representation comparing the shapes of two coder analysis windows for the TDAC transform and DFT coders.

FIG. 16 is a graphical representation comparing the characteristic filter response of a TDAC transform coder using windows with 100% overlap to the response of a DFT coder using windows with 25% overlap.

MODES FOR CARRYING OUT THE INVENTION

PREFERRED IMPLEMENTATION OF ENCODER/DECODER

Figure 5:
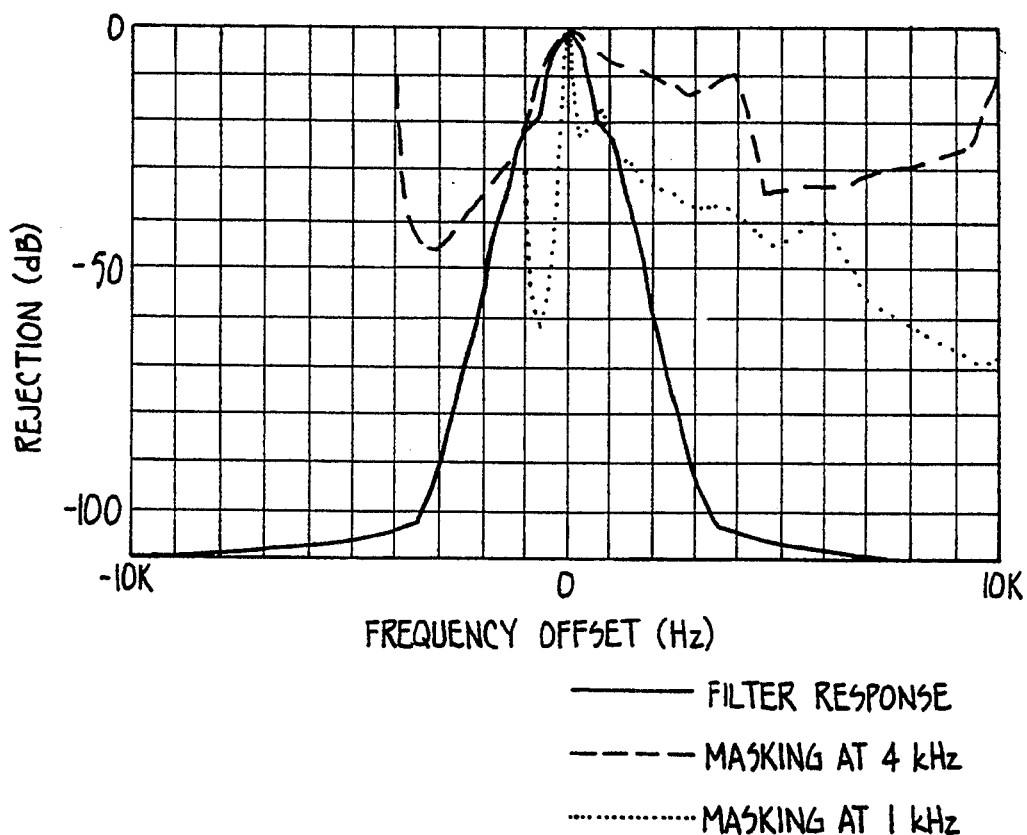
FIG. 5 is a graphical representation showing a representative TDAC coder filter characteristic response curve and two psychoacoustic masking curves.

FIGS. 1a and 1b show the basic structure of an encoder and a decoder, respectively, incorporating a window function designed according to the teachings of the present invention. The encoder portion shown in FIG. 1a comprises time-domain signal input 100, signal sampler and quantizer 101, signal sample buffer 102, analysis-window multiplier 103 which modulates each digitized time-domain signal block, digital filter bank 104 which transforms the quantized signal into frequency coefficients, block-floating-point encoder 105 which converts each integer-valued transform coefficient into a floating-point representation, adaptive bit allocator 106 which assigns bits to the representation of each transform coefficient according to the total signal's spectral composition, uniform quantizer 107 which rounds each transform coefficient to an assigned bit length, and formatter 109 which assembles the coded frequency coefficients into a bit stream for transmission or storage. FIG. 1a depicts a transmission path 110, however, it should be understood that the encoded signal may be stored immediately for later use.

The decoder portion shown in FIG. 1b comprises encoded bit-stream signal input 111, deformatter 112 which extracts each encoded frequency coefficient from the assembled bit stream, linearizer 113 which converts each encoded coefficient into an integer-valued transform coefficient, inverse digital filter bank 114 which transforms the transform coefficients into a time-domain signal block, synthesis-window multiplier 115 which modulates the time-domain signal block, signal block overlap-adder 116 which recovers a digitized representation of the time-domain signal, analog signal generator 117, and analog signal output 118.

Any one of several discrete digital transforms may be used to implement the forward and inverse filter banks. The transform used in the preferred embodiment was first described in Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153–1161. This technique is the time-domain equivalent of a critically sampled single-sideband analysis-synthesis system. This transform is referred to herein as Time-Domain Aliasing Cancellation (TDAC). The Discrete Fourier Transform (DFT) may be used in another embodiment. The preferred embodiment for the DFT version is discussed after the TDAC version has been fully described.

Specific considerations for hardware implementation of encoders and decoders are not particularly critical to the practice of the present invention and so are not discussed here. Some considerations are disclosed in U.S. Pat. No. 5,222,189, incorporated herein by reference.

INPUT SIGNAL SAMPLING AND WINDOWING

As discussed above, the length of the signal sample block created by signal sampling and quantizing means 101 is of critical importance. The length must be chosen to balance signal propagation delay with digital filter performance. The forward transform (digital filter bank 104) must wait for all of the block's samples before all transform coefficients may be calculated. A similar delay is experienced by the inverse transform (digital filter bank 114), waiting for all coefficients before the time-domain signal may be recovered. As a result, assuming both forward and inverse transforms may be performed in a period of time equal in magnitude to the block interval, the delay for a signal passing through the invention is three times the block length. Because the desired overall delay is no greater than approximately 10 milliseconds, the block length should not exceed 3.3 milliseconds.

It is desirable, however, to use as long a block as possible because shorter block lengths reduce the filter bandwidth and adversely affect the transition band rolloff and depth of stopband rejection. Therefore, the chosen block length should be as long as possible, subject to the 3.3 millisecond limitation discussed in the previous paragraph.

A music signal with at least Compact Disc (CD) quality has, in addition to other qualities, a bandwidth of approximately 20 kHz. From the Nyquist theorem, it is known that a 20 kHz bandwidth signal must be sampled at no less than 40 Khz. A sample rate of 44.1 Khz is chosen for the current embodiment of the invention because this rate is used in CD applications and such a choice simplifies the means necessary to use this invention in such applications. Given this sampling rate, a 3.3 millisecond block comprises 147 samples. Digital filter transform calculations are simplified, however, if the number of samples is a power of two. Consequently, the number of samples per block is reduced to 128 which establishes the block length at 2.9 milliseconds.

Other sampling rates, such as 48 kHz which is a rate common to many professional audio applications, may be utilized. If an alternate rate is chosen, the frequency separation between adjacent transform coefficients will be altered and the number of coefficients required to represent the desired signal bandwidth will change. The full effect that a change in sampling rate will have upon the implementation of the invention will be apparent to one of ordinary skill in the art.

Assuming the input signal is not a complex one, i.e., all imaginary components are zero, a frequency-domain transform of a 128 sample block produces at most 64 unique nonzero transform coefficients. Hence, the filter banks incorporated in the encoder and decoder shown in FIGS. 1a and 1b comprise 64 frequency bins. In this implementation, the bandwidth of each bin is equal to 344.5 Hz (or 44.1 kHz/128). (For some discrete transforms such as TDAC, bin 0, the DC or zero frequency component, has a bandwidth equal to half of this amount.) Coefficients 0–62 are used to pass a 21.5 kHz signal. The additional high-frequency coefficients above the input signal bandwidth are used to minimize the adverse effects of quantizing errors upon aliasing cancellation within the design bandwidth. Note that it is assumed the input signal is band-limited to 20 kHz and the final output signal is also band-limited to reject any aliasing passed in the highest coefficients.

Unless the sample block is modified, a discrete transform will erroneously create nonexistent spectral components because the transform assumes the signal in the block is periodic. See FIG. 2. These transform errors are caused by discontinuities at the edges of the block as shown in FIG. 3. These discontinuities may be smoothed to minimize this effect. FIGS. 4a through 4d illustrate how a block is modified or weighted such that the samples near the block edges are close to zero. The multiplier circuit shown in FIG. 4a modulates the sampled input signal x(t) shown in FIG. 4b by the weighting function shown in FIG. 4c. The resultant signal is shown in FIG. 4d. This process is represented by box 103 in FIG. 1a. This weighting function, called an analysis window, is a sample-by-sample multiplication of the signal sample block, and has been the subject of considerable study because its shape has profound affects upon digital filter performance. See, for example, Harris, "On the Use of Windows for Harmonic Analysis with the Discrete Fourier Transform," *Proc. IEEE*, vol. 66, 1978, pp. 51–83. Briefly, a good window increases the steepness of transition band rolloff for a given level of depth of stopband rejection, and permits correction of its modulation effects by overlapping and adding adjacent blocks. Window design is discussed below in more detail.

ANALYSIS FILTER BANK—FORWARD TRANSFORM

A discrete transform implements digital filter bank 104 shown in FIG 1a. Filtering is performed by converting the time-domain signal sample blocks into a set of time varying spectral coefficients. The transform technique used in one embodiment of an encoder is Time-Domain Aliasing Cancellation (TDAC).

TDAC utilizes a transform function which is equivalent to the alternate application of a modified Discrete Cosine Transform (DCT) with a modified Discrete Sine Transform (DST). The modified DCT, shown in equation 1, and the modified DST, shown in equation 2, are $$C(k) = \sum_{n=0}^{N-1} x(n) \cdot \cos\left[2\pi k \left(\frac{n+m}{N}\right)\right] \quad (1)$$
for $0 \leq k < N$ $$S(k) = \sum_{n=0}^{N-1} x(n) \cdot \sin\left[2\pi k \left(\frac{n+m}{N}\right)\right] \quad (2)$$
for $0 \leq k < N$ where
k=frequency coefficient number,
n=input signal sample number,
N=sample block length,
m=phase term for TDAC,
x(n)=quantized value of input signal x(t) at sample n,
C(k)=DCT coefficient k, and
S(k)=DST coefficient k.

The TDAC transform alternately produces one of two sets of spectral coefficients or transform blocks for each signal sample block. These transform blocks are of the form $$\{C(k)\}_i = \begin{bmatrix} C(k) & \text{for } 0 \leq k < \frac{N}{2} \\ 0 & \text{for } k = \frac{N}{2} \end{bmatrix} \quad (3)$$

$$\{S(k)\}_i = \begin{bmatrix} S(k) & \text{for } 1 \leq k \leq \frac{N}{2} \\ 0 & \text{for } k = 0 \end{bmatrix} \quad (4)$$

where
i=signal sample block number,
C(k)=DCT coefficient (see equation 1), and
S(k)=DST coefficient (see equation 2).

One efficient computation algorithm which may be used is the Fast Fourier Transform (FFT). Additional implementation details may be obtained from U.S. Pat. No. 5,222,189, incorporated herein by reference.

Princen showed that with the proper phase component m (see equation 6) and a carefully designed pair of analysis-synthesis windows, the TDAC technique can accurately recover an input signal from an alternating sequence of cosine and sine transform blocks of the form $$\{C(k)\}_0, \{S(k)\}_1, \{C(k)\}_2, \ldots \quad (5)$$

where each transform block represents one time-domain signal sample block. This process is shown in FIGS. 8a–8e, 9a–9d, and 10a–10g.

Referring to FIG. 8a, it may be seen that quantized input signal x(t) is grouped into blocks. One set of blocks, modulated by the window function $W_c$ shown in FIG. 8b, produces signal $x_c(t)$ shown in FIG. 8d. Signal $x_c(t)$ is input to the DCT. Another set of blocks of the sampled input signal x(t), which overlap the first set by one-half block length, are windowed by window function $W_s$ shown in FIG. 8c (which window function is identical to $W_c$ but shifted in time by one-half block length) producing signal $x_s(t)$ shown in FIG. 8e and subsequently passed to the DST.

Using only the alternate DCT and DST transform blocks results in a loss of the information contained in the discarded half of the transform blocks. This loss produces a time-domain aliasing component, but the distortion may be cancelled by choosing the appropriate phase term m for equations 1 and 2, applying the forward transform to overlapped time-domain signal sample blocks, and by overlapping and adding adjacent time-domain signal sample blocks recovered by the inverse transform.

The phase term m in equations 1 and 2 controls the phase shift of the time-domain aliasing distortion. FIGS. 9a–9d and 10a–10g illustrate this distortion. Signal $y_c(t)$, recovered from the inverse DCT, is shown in FIG. 9a. FIG. 9b illustrates that the recovered signal is composed of two components: the original windowed signal (solid line), and time-domain aliasing distortion (dotted line). FIGS. 9c and 9d illustrate similar information for signal $y_s(t)$ recovered from the inverse DST. To cancel this alias distortion and accurately recover the original time-domain signal, TDAC requires the aliasing to be as follows. For the DCT, the time-domain alias component consists of the first half of the sampled signal reversed in time about the one-quarter point of the sample block, and the second half of the sampled signal reversed in time about the three-quarter point of the sample block. For the DST, the alias component is similar to that for the DCT except its amplitude is inverted in sign. See FIGS. 9b and 9d. The phase term required for alias cancellation is $$m = \frac{(N/2 + 1)}{2} \qquad (6)$$

where N=sample block length.

TDAC also requires application of a pair of carefully designed analysis-synthesis windows to overlapped signal sample blocks. The signal sample blocks must have a 100% overlap, i.e., 50% of a given block is overlapped by the previous block, and 50% of the same block is overlapped by the following block. FIGS. 10a-10g illustrate the overlapping of signal sample blocks and the resulting cancellation of alias distortion. Signals $y_c(t)$ and $y_s(t)$ shown in FIGS. 10a and 10d, recovered from the inverse DCT and DST, are modulated by window functions $W_c(t)$ and $W_s(t)$ respectively, shown in FIGS. 10b and 10e, to produce signals $\bar{y}_c(t)$ and $\bar{y}_s(t)$ shown in FIGS. 10c and 10f. When the overlapped blocks of these windowed signals are added, the alias components are cancelled and the resulting signal y(t) shown in FIG. 10g is an accurate reconstruction of the original input signal x(t).

Window design and overlap-add used during the synthesis process is discussed below in more detail. It is sufficient at this point to notice that omitting half the transform blocks halves the required bit rate, but the 100% window overlap required for TDAC during signal synthesis doubles the required bit rate. Consequently, TDAC has a neutral effect upon the required bit rate.

ENCODING PROCESSING

Figure 11:
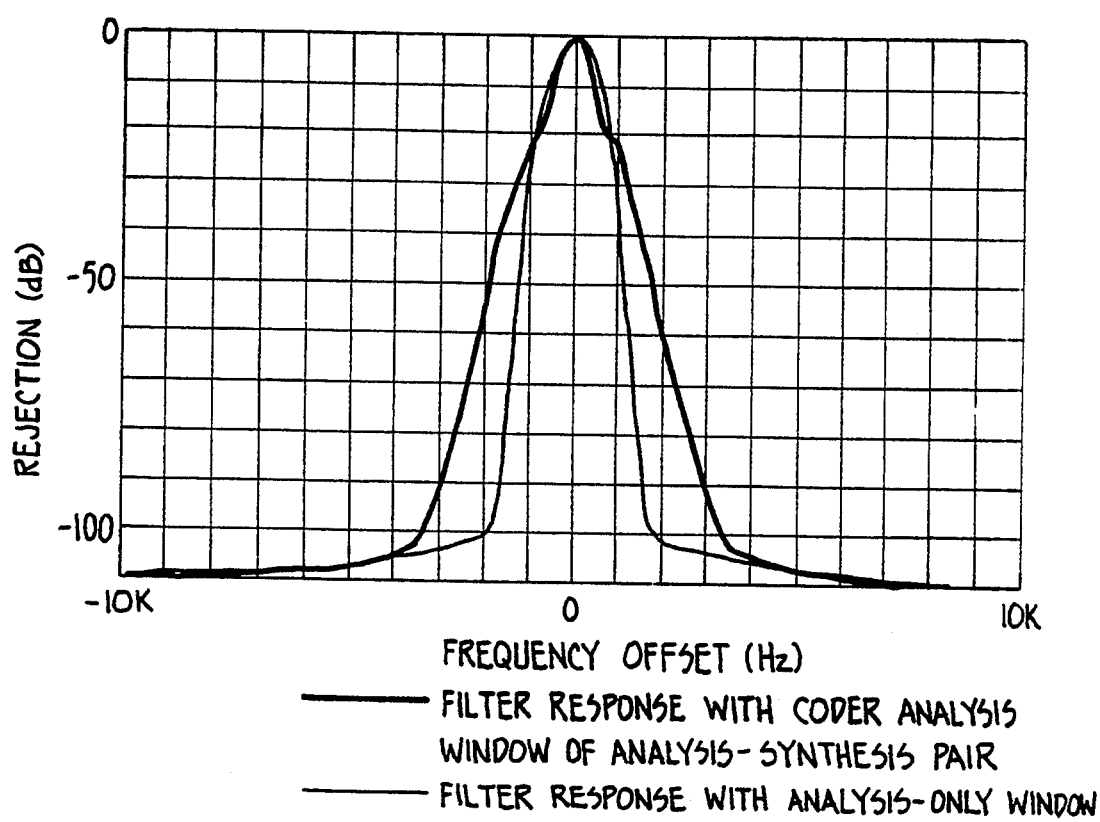
FIG. 11 is a graphical representation comparing filter transition band rolloff and stopband rejection of a filter bank using an analysis-only window with that of a filter bank using the analysis window of an analysis-synthesis window pair designed for the preferred TDAC transform embodiment of the invention.

Each transform coefficient derived from filter bank 104 is encoded and grouped into subbands by nonuniform quantizer 108. In a preferred embodiment, nonuniform quantizer 108 comprises adaptive bit allocation 106 which allocates a minimum number of bits to each transform coefficient. The minimum number of bits was derived by comparing a representative filter bank response curve to a psychoacoustic masking threshold curve. Because filter performance is a function only of the difference in frequency between a signal and the coefficient's frequency, any frequency coefficient may be used to represent the filter bank's response. The response curve shown in FIG. 5 is obtained from the root mean square average of the filter's response to a range of frequencies within the filter passband. As discussed above, filter selectivity is affected by the shape of the analysis window and the number of samples in each time-domain signal block. It may be noted here that the overall coder characteristic response is not as good as that shown in FIG. 5 because an additional selectivity loss occurs during the signal synthesis process. This effect is discussed below and is also shown in FIG. 11.

Two psychoacoustic masking curves are shown in FIG. 5. These curves were derived from Fielder, "Evaluation of the Audible Distortion and Noise Produced by Digital-Audio Converters," *J. Audio Eng. Soc.*, vol. 35, 1988, pp. 517-534. Auditory selectivity of the human ear varies greatly with frequency, however, the 1 kHz curve is representative of ear characteristics for frequencies between 500 Hz and 2 kHz, and the 4 kHz curve is representative of the ear's response to higher frequencies. The rate of transition band rolloff and depth of stopband rejection for a transform coder must be as great as that for the psychoacoustic masking curve to achieve the lowest bit rates. In particular, note that ear selectivity for frequencies below a 1 kHz masking tone is very high. Other transform coders in the art have achieved the required subband bandwidth and selectivity by using time-domain block lengths of at least 512 samples. For example, see Brandenburg, "OCF—A New Coding Algorithm for High Quality Sound Signals," *IEEE Int. Conf. on Acoust., Speech, and Signal Proc.*, 1987, pp. 141-144.

Figure 6:
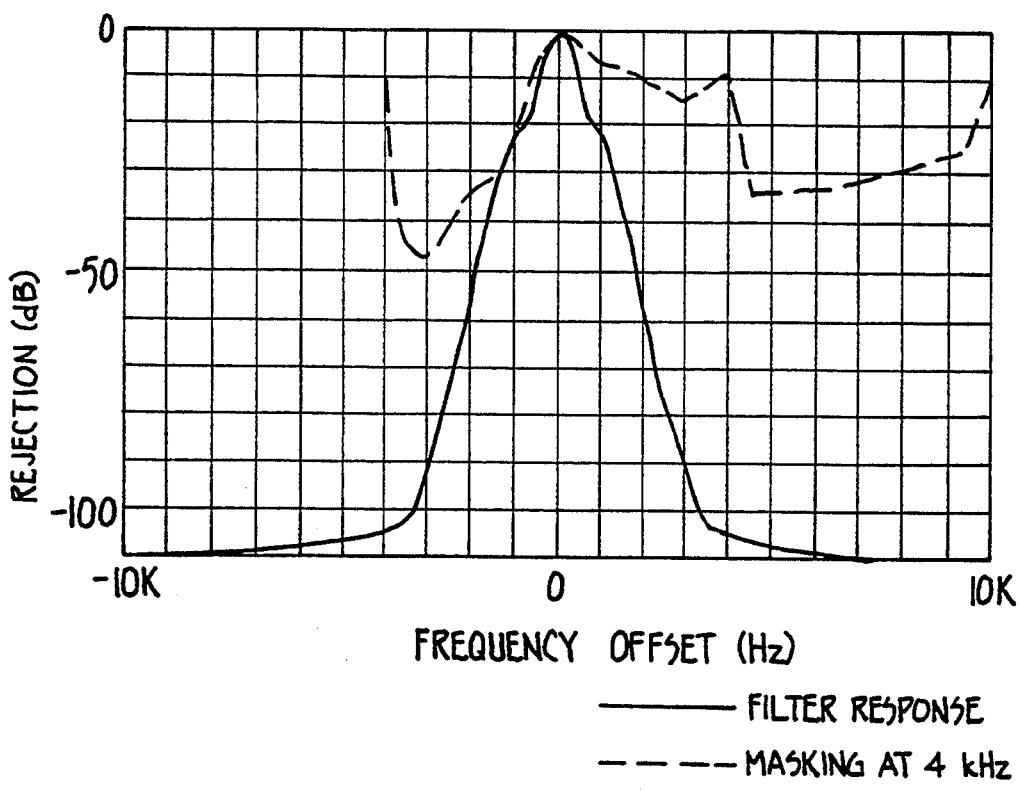
FIG. 6 is a graphical representation showing a TDAC coder filter characteristic response with respect to a 4 kHz psychoacoustic masking curve.

Because of time delay constraints discussed above, the encoder uses a 128 sample block and must overcome undesirably wide subband bandwidth and degraded filter selectivity in other ways. This is accomplished in part by reserving additional bits for all coded frequency coefficients below 4 kHz. FIG. 6 compares the filter response against the 4 kHz psychoacoustic masking curve. Because coder bandwidth and selectivity improve relative to the psychoacoustic masking curve as frequency increases, fewer bits are required to represent higher frequency transform coefficients above 4 kHz.

Figure 7:
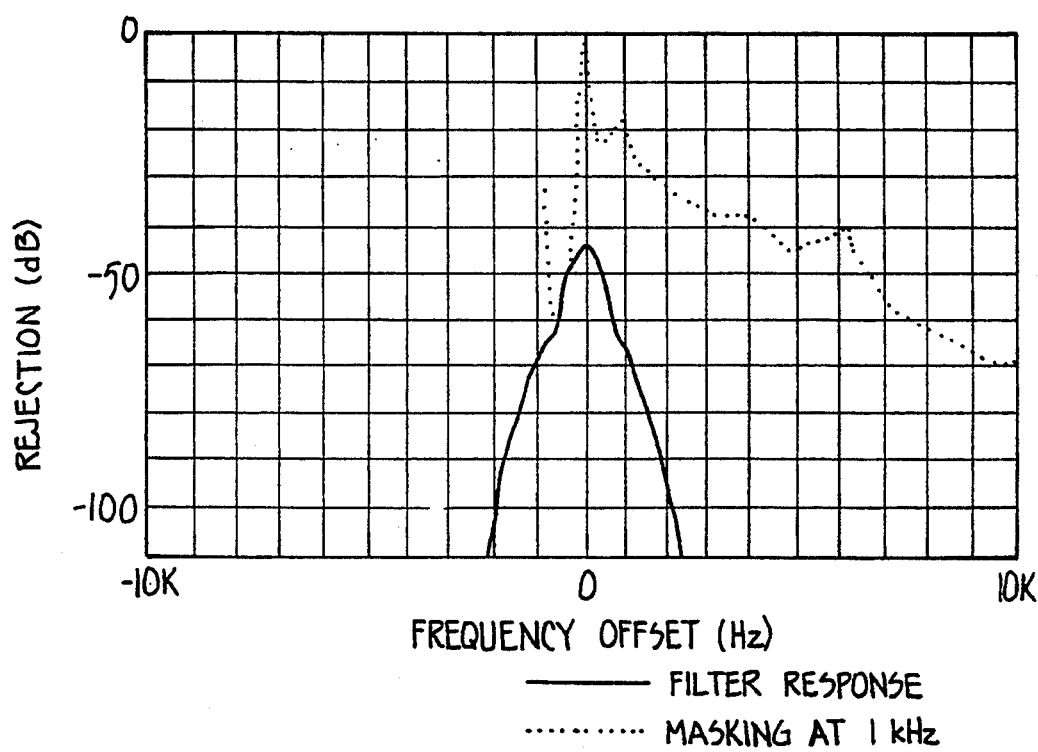
FIG. 7 is a graphical representation showing a TDAC coder filter characteristic response with respect to a I kHz psychoacoustic masking curve.

FIG. 7 compares the 1 kHz masking curve against the filter response curve which is offset such that the psychoacoustic masking curve is always higher. The offset for the filter response is due to the increased accuracy afforded by additional bits reserved for the lower-frequency coefficients. Each additional bit improves the signal-to-noise ratio approximately 6 db. The graph in FIG. 7 indicates an offset of 42 dB (or approximately 7 additional bits of accuracy) may be necessary to encode a low-frequency transform coefficient if no other tones are present to contribute to the masking effect.

A formatting process prepares the encoded transform blocks for transmission or storage. This process is represented by box 109 in FIG. 1a. The formatted frame is now ready for transmission or for storage. FIG. 1a illustrates transmission means 110. Transmission media include public dissemination such as broadcasting, internal use such as studio monitoring or signal mixing, and interfacility or telephonic use via terrestrial or satellite links. Storage media include magnetic tape and magnetic or optical disks.

Additional detail regarding nonuniform quantization, adaptive bit allocation, and other encoding processing referred to above, may be obtained from U.S. Pat. No. 5,222,189, incorporated herein by reference.

DECODING PROCESSING

A deformatting process takes place when the digitized and coded signal is received from transmission means 111 either by receipt of a transmitted signal or retrieved from storage. The process is represented by box 112 in FIG. 1b. If the formatted frame of code words was randomized prior to transmission, the formatted frame is recovered by an inverse randomizing process. Then the frame is split into the component parts of each transform block: the master exponents, subband exponents, fixed length portion of transform coefficient code words, and adaptively assigned bits.

Error correction codes, if present, may be used to rectify errors introduced during transmission or storage.

Additional detail regarding decoding processing may be obtained from U.S. Pat. No. 5,222,189, incorporated herein by reference.

SYNTHESIS FILTER BANK—INVERSE TRANSFORM

Box 114 in FIG. 1b represents a bank of synthesis filters which transform each set of frequency-domain coefficients recovered from the deformatting and linearization procedures into a block of time-domain signal samples. An inverse transform from that used in analysis filter bank 104 in FIG. 1a implements synthesis filter bank 114. The inverse transforms for the TDAC technique used in one embodiment of a decoder are alternating applications of a inverse modified DCT and an inverse modified DST. Because half of the transform blocks are omitted from transmission or storage (see expression 5), those blocks must be recreated for the inverse transforms. The missing DCT blocks may be recreated from the available DCT blocks as shown in equation 7. The missing DST blocks may be recreated as shown in equation 8. The inverse modified DCT is expressed in equation 9, and the inverse modified DST is expressed in equation 10.

$$\hat{C}(k) = -\hat{C}(N - k) \quad \text{for } N/2 \leq k < N \tag{7}$$

$$\hat{S}(k) = \hat{S}(N - k) \quad \text{for } N/2 < k \leq N \tag{8}$$

$$\hat{x}(n) = \frac{1}{K} \sum_{k=0}^{K-1} \hat{C}(k) \cdot \cos\left[2\pi k\left(\frac{n+m}{K}\right)\right] \tag{9}$$
for $0 \leq n < N$ $$\hat{x}(n) = \frac{1}{K} \sum_{k=0}^{K-1} \hat{S}(k) \cdot \sin\left[2\pi k\left(\frac{n+m}{K}\right)\right] \tag{10}$$
for $0 \leq n < N$ where
  k = transform coefficient number,
  n = signal sample number,
  K = number of transform coefficients,
  N = sample block length,
  m = phase term for TDAC (see equation 6),
  $\hat{C}(k)$ = quantized DCT coefficient k,
  $\hat{S}(k)$ = quantized DST coefficient k, and
  $\hat{x}(n)$ = recovered quantized signal x(n).

Calculations are performed using an FFT algorithm. The same techniques as those employed in the forward transform are used in the inverse transform to permit concurrent calculation of both the DCT and DST using a single FFT.

FIGS. 8a–8e and 10a–10g illustrate the transform process of the analysis-synthesis filter banks. The analysis filter bank transforms the time-domain signal into an alternating sequence of DCT and DST blocks. The inverse transform applies the inverse DCT to every other block, and applies the inverse DST to the other half of the blocks. As shown in FIGS. 9a–9d, the recovered signal contains aliasing distortion. This distortion is cancelled during a subsequent time-domain block overlap-add process represented by box 116 in FIG. 1b. The overlap-add process is discussed below.

SYNTHESIS WINDOW

FIGS. 10a–10g illustrate cancellation of time-domain aliasing by the overlap-add of adjacent time-domain signal sample blocks. As derived by Princen, to cancel time-domain aliasing distortion, the TDAC transform requires the application of a synthesis window identical to the analysis window and an overlap-add of adjacent blocks. Each block is overlapped 100%; 50% by the previous block and 50% by the following block. Synthesis-window modulation is represented by box 115 in FIG. 1b.

Analysis-synthesis window design must consider filter bank performance. Because both windows are used to modulate the time-domain signal, the total effect upon filter performance is similar to the effect caused by a single window formed from the product of the two windows. Design of the analysis-synthesis window pair, therefore, is accomplished by designing a suitable product-window representing a point-by-point multiplication of the analysis and synthesis windows. This design is highly constrained, reducing flexibility in trading off the steepness of transition band rolloff and the depth of stopband rejection. As a result, filter performance is degraded to a greater extent than it is by an analysis-only window designed without this constraint. For example, see FIG. 11.

While analysis windows have received much attention, the prior art teaches little about analysis-synthesis window pairs. The technique described below derives a good analysis-synthesis window pair frown a known good analysis-window design. While any analysis window may be used as a starting point, several windows permit design of a filter bank with good selectivity, and they offer a means to trade off steepness of transition band rolloff against depth of stopband rejection. Three examples are the Kaiser-Bessel window, the Dolph-Chebyshev window, and a window derived from finite impulse filter coefficients using the Parks-McClellan method. See Parks and McClellan, "Chebyshev Approximation for Nonrecursive Digital Filters with Linear Phase," *IEEE Trans. Circuit Theory*, vol. CT-19, March 1972, pp. 189–94. Only the Kaiser-Bessel window is discussed here. This window allows the trade off mentioned above through the choice of a single parametric alpha value. As a general rule, low alpha values improve transition band rolloff, and high alpha values increase the depth of stopband rejection. See Harris, cited above.

An alpha value in the range of 4 through 7 is usable in the preferred embodiment of an encoder and decoder incorporating window functions designed according to the teachings of the present invention. This range provides a good compromise between steepness of transition band rolloff at mid-frequencies (1-2 kHz), and depth of stopband rejection for low frequencies (below 500 Hz) and high frequencies (above 7 kHz). The range of acceptable alpha values was determined using computer simulations by identifying the lowest alpha values which have sufficient stopband rejection to keep quantizing noise below the psychoacoustic masking threshold.

The Kaiser-Bessel window function is $$W(n) = \frac{I_0\left[\pi\alpha\sqrt{1-\left(\frac{n}{N/2}\right)^2}\right]}{I_0[\pi\alpha]} \quad \text{for } 0 \leq n < N \tag{11}$$

where $\alpha$ = Kaiser-Bessel alpha factor,
n = window sample number,
N = window length in number of samples, and $$I_0[x] = \sum_{k=0}^{\infty} \frac{(x/2)^k}{k!}.$$

To satisfy the overlap-add criteria, an analysis-synthesis product-window WP(n) of length N is derived by convolving window W(n) of length v+1 with a rectangular window of length N-v. The value v is the window overlap-add interval. The overlap-add process cancels alias distortion and the modulation effects of the analysis and synthesis windows. The convolution which derives the product window is shown in equation 12, where the denominator of the expression scales the window such that its maximum value approaches but does not exceed unity. This expression may be simplified to that shown in equation 13.

$$WP(n) = \frac{\sum_{k=0}^{N-1} s(k)W(n-k)}{\sum_{k=0}^{v} W(k)} \quad \text{for } 0 \leq n < N \quad (12)$$

$$WP(n) = \frac{\sum_{k=0}^{N-v-1} W(n-k)}{\sum_{k=0}^{v} W(k)} \quad \text{for } 0 \leq n < N \quad (13)$$

where
n = product-window sample number,
v = number of samples within window overlap interval,
N = desired length of the product-window,
W(n) = beginning window function of length v+1,
WP(n) = derived product-window of length N, and $$s(k) = \begin{bmatrix} 1 & \text{for } 0 \leq k < N-v \\ 0 & \text{otherwise.} \end{bmatrix}$$

The analysis and synthesis windows shown in equations 14 and 15 are obtained by taking the derived product-window WP(n) to the A and S powers respectively.

$$WA(n) = WP(n)^A \quad \text{for } 0 \leq n < N \quad (14)$$
$$WS(n) = WP(n)^S \quad \text{for } 0 \leq n < N \quad (15)$$

where
WP(n) = derived product-window (see equations 12 and 13),
WA(n) = analysis window,
WS(n) = synthesis window,
N = length of the product-window, and
A+S = 1.

In the current embodiment of the invention, the analysis and synthesis windows have a length of 128 samples with a 100% window overlap, or an overlap interval of 64 samples. The values of A and S are each set to one-half which produces a pair of identical analysis and synthesis windows as required by the TDAC transform. Substituting these values into equation 13, the resulting analysis window is seen to be $$WA(n) = \sqrt{\frac{\sum_{k=0}^{63} W(n-k)}{\sum_{k=0}^{64} W(k)}} \quad \text{for } 0 \leq n < N \quad (16)$$

where W(n) = Kaiser-Bessel function of length 65, and the alpha factor is in the range 4 to 7.

OVERLAPP-ADD

An additional requirement is placed upon window design: the analysis and synthesis windows must be designed such that the analysis-synthesis product-window always sums to unity when two adjacent product-windows are overlapped. This requirement is imposed because an overlap-add process is used to cancel the time-domain effects of the analysis-and synthesis-window modulation. This process is represented by box 116 in FIG. 1b, and illustrated in FIGS. 10a–10g. Signals $y_c(t)$ and $y_s(t)$, recovered from the inverse DCT and DST respectively, are shown in FIGS. 10a and 10d. Each signal is grouped into a series of blocks. Each signal block is modulated by the synthesis-window functions shown in FIGS. 10b and 10e. The resulting blocks of signals $\bar{y}_c(t)$ and $\bar{y}_s(t)$ are shown in FIGS. 10c and 10f. The two signals, overlapped by one-half block length, are added to produce signal y(t), shown in FIG. 10g. Signal y(t) is an accurate reconstruction of the original input signal.

As shown in FIG. 12, a signal sample at some time $n_0t$ within the overlap interval between block k and block k30 1 is represented by a sample in each of the two blocks. Following an overlap-add of the two windowed blocks, the recovered signal sample at time $n_0t$ is seen to be the sum of the samples from windowed blocks k and k+1, which may be expressed as $$x(n_0t) = WP_k(n_0t) \cdot x(n_0t) + WP_{k+1}(n_0t) \cdot x(n_0t) \quad (17)$$

where
$WP_k(n_0t) = WA_k(n_0t) \cdot WS_k(n_0t) = \{WA_k(n_0t)\}^2$,
$WA_k(n_0t)$ = analysis window in block k at time $n_0t$,
$WS_k(n_0d)$ = synthesis window in block k at time $n_0t$, and
$WA_k(n_0t) = WS_k(n_0t)$ as required by the TDAC transform.

The product-window modulation effects are cancelled if the sum of the two adjacent product-windows across the window overlap interval equals unity. Therefore, signal x(nt) may be accurately recovered if $$WP_k(nt) + WP_{k+1}(nt) = 1 \quad \text{for } 0 \leq n < N \quad (18)$$

for all time samples nt within the overlap interval between block k and block k+1.

It is difficult to work with the product-window as a function of time, so it is desirable to translate the requirement as expressed in equation 18 into a function of window sample number n. Equations 19 through 22 express this requirement for a product-window created from the product of a pair of 128 sample analysis and synthesis windows with 100% overlap. Equation 19 represents the overlap of the first half of window $WP_k$ and the last half of the previous window $WP_{k-1}$. Equation 20 represents the overlap of the last half of window $WP_k$ and the first half of the following window $WP_{k+1}$. Equations 21 and 22 show the equivalent expressions in terms of the analysis window. Note that the analysis and synthesis windows must be identical for the TDAC transform.

$$WP_{k-1}(n + 64) + WP_k(n) = 1 \quad \text{for } 0 \leq n < 64 \tag{19}$$

$$WP_k(n) + WP_{k+1}(n - 64) = 1 \quad \text{for } 64 \leq n < 128 \tag{20}$$

$$\{WA_{k-1}(n + 64)\}^2 + \{WA_k(n)\}^2 = 1 \quad \text{for } 0 \leq n < 64 \tag{21}$$

$$\{WA_k(n)\}^2 + \{WA_{k+1}(n - 64)\}^2 = 1 \quad \text{for } 64 \leq n < 128 \tag{22}$$

where $WP_k(n) = WA_k(n) \cdot WS_k(n) = \{WA_k(n)\}^2$, $WA_k(n)$ = analysis window value for sample n in block k, $WS_k(n)$ = synthesis window value for sample n in block k, and $WA_k(n) = WS_k(n)$ as required by the TDAC transform.

Box 117 in FIG. 1b represents the process of converting the digital information recovered by overlap-add into an analog form. This process is not critical to the practice of the present invention.

ALTERNATIVE DFT IMPLEMENTATION OF ENCODER/DECODER

The TDAC transform is preferred for most applications; however, the signal processing resources required for a TDAC coder are greater than that required for Discrete Fourier Transform (DFT) based coders. Using a DFT, a coder may be implemented which requires less memory, processing speed, and arithmetic accuracy to only 16 significant bits. The design objectives for the DFT coder are the same as that for the TDAC version: CD quality signal, minimal bit rates, and low time delay through the coder. The following discussion assumes a sample rate of 48 kHz although other rates such as the 44.1 kHz sample rate discussed above for the TDAC version may also be used.

FIGS. 14a and 14b show the basic structure of a DFT embodiment of an encoder and a decoder. This structure is similar to that of the TDAC version. Four differences are required to compensate for the lower accuracy of 16-bit arithmetic: (1) a preemphasis gain is applied to the analog input signal by a network represented by box 2219, (2) block-floating-point encoder represented by box 2220 operates prior to analysis-window modulation represented by box 2203, (3) block-floating-point decoder represented by box 2222 operates to recover the time-domain signal samples into 16-bit integer form, and (4) a complementary postemphasis boost represented by box 2224 is applied to the analog output signal.

As discussed above, the input signal is attenuated by preemphasis gain prior to sampling and quantization. The sampling in the DFT embodiment under discussion here occurs at 48 kHz. The quantized values from the ADC are 16 bits in length and are buffered into blocks 128 samples in length. One block is received every 2.67 milliseconds, which provides for a short propagation delay through the coder.

The buffered block of samples is then converted into a block-floating-point representation and then modulated by an analysis window.

This analysis window is different from that used by the TDAC coder because of differences between the TDAC transform and the DFT. Unlike the TDAC transform, the DFT creates a sequence of one type of transform block. Each transform block is comprised of a pair of values for each of 41 transform coefficients; a real value component and an imaginary value component. (Coefficient 0 is an exception, represented by a single real value component.) It is important to choose a window design which reduces the amount of input signal sample block overlap because the transmission rate or data storage requirements is doubled for the signal samples in the overlap interval. The DFT coder using an analysis window with 100% overlap requires approximately two times the bit rate as that required by the TDAC coder.

Unlike the TDAC window, the DFT window exhibits a gain of unity over a large interval, thereby reducing the block overlap length from 64 to 16 samples. See FIG. 15. This reduction degrades the digital filter stopband rejection, but it incurs an increase in data rate of only 14.3% (128/(128-16)) over that of the TDAC coder.

The DFT window is generated in a manner similar to that of the TDAC embodiment except that the kernel Kaiser-Bessel function is 17 samples in length and has an alpha factor within the range of 1.5 to 3. See equation 11. The range of acceptable alpha values was determined in the same manner as that discussed above for the TDAC transform windows. Substituting these values into equations 12 through 15, the analysis and synthesis windows are obtained from the square root of the convolution product of the Kaiser-Bessel window and a rectangular window of a length 112 (the block length of 128 minus the overlap length of 16). The DFT analysis window is $$WA(n) = \sqrt{\frac{\sum_{k=0}^{111} W(n-k)}{\sum_{k=0}^{16} W(k)}} \quad \text{for } 0 \leq n < N \tag{23}$$

where W(n) = Kaiser-Bessel function of length 17, and the alpha factor is in the range 1.5 to 3.

The DFT and TDAC analysis windows are shown in FIG. 15. As shown in FIG. 16, the DFT window has poorer frequency selectivity than the TDAC window because of the reduced amount of overlap.

The remaining functions represented in FIGS. 14a and 14b such as quantizing, formatting, deformatting and dequantizing are not critical to the practice of the present invention and are not discussed further. Additional detail may be obtained frown U.S. Pat. No. 5,222,189, incorporated herein by reference.

I claim:

1. A method for encoding a signal comprising signal samples, said method comprising
   generating a window-weighted sample block by weighting a block of said signal samples with a window function, wherein said window function is an analysis window within an analysis-/synthesis window pair, each of length N, and the product of both windows in said pair is a product window of length N with an overlap interval V, said product window when overlapped with a shifted replica of itself sums to a constant value across the overlap interval, filtering said window-weighted sample block to generate frequency subband information, and representing said frequency subband information in a form suitable for transmission or storage, wherein said analysis-/synthesis-window pair is prederived by (1) generating an initial window having a length of $1+V$, (2) generating an interim window by convolving said initial window with a unit pulse function of length $N-V$, (3) defining a scaling factor by convolving said initial window with a unit pulse function of length one, (4) obtaining said product window by dividing said interim window by said scaling factor, and (5) obtaining said window function by taking the Ath power of said product window, wherein $0<A<1$.

2. A method according to claim 1 wherein said filtering applies either a filter bank or a transform to said window-weighted sample block.

3. A method for reproducing a signal represented by encoded information, said method comprising receiving said encoded information and extracting frequency subband information therefrom, filtering said frequency subband information to generate a signal sample block, and weighting said signal sample block with a window function, wherein said window function is a synthesis window within an analysis-/synthesis-window pair, each of length N, and the product of both windows in said pair is a product window of length N with an overlap interval V, said product window when overlapped with a shifted replica of itself sums to a constant value across the overlap interval, wherein said analysis-/synthesis-window pair is prederived by (1) generating an initial window having a length of $1+V$, (2) generating an interim window by convolving said initial window with a unit pulse function of length $N-V$, (3) defining a scaling factor by convolving said initial window with a unit pulse function of length one, (4) obtaining said product window by dividing said interim window by said scaling factor, and (5) obtaining said window function by taking the Sth power of said product window, wherein $0<S<1$.

4. A method according to claim 3 wherein said filtering applies either an inverse filter bank or an inverse transform to said block of frequency subband information.

5. A method according to claim 1 or 3 wherein said initial window is selected from the set of Kaiser-Bessel windows, Dolph-Chebyshev windows, and windows derived from finite impulse filter coefficients using the Parks-McClellan method.

6. A method according to claim 1 or 3 wherein said filtering has a frequency response characteristic with a passband, a stopband and transition band between said passband and said stopband.

7. A method according to claim 6 wherein steepness of transition band rolloff is maximized for a given depth of stopband rejection.

8. An apparatus according to claim 6 wherein steepness of transition band rolloff substantially follows the lower slope of the human auditory system's psychoacoustic masking threshold.

9. A method according to claim 6 wherein depth of stopband rejection is substantially equal to or less than the human auditory system's psychoacoustic masking threshold.

10. An apparatus for encoding a signal comprising signal samples, said encoder comprising means for obtaining a window function, wherein said window function is an analysis window within an analysis-/synthesis-window pair, each of length N, and the product of both windows in said pair is a product window of length N with an overlap interval V, said product window when overlapped with a shifted replica of itself sums to a constant value across the overlap interval, said window function obtained by (1) generating an initial window having a length of $1+V$, (2) generating an interim window by convolving said initial window with a unit pulse function of length $N-V$, (3) defining a scaling factor by convolving said initial window with a unit pulse function of length one, (4) obtaining said product window by dividing said interim window by said scaling factor, and (5) obtaining said window function by taking the Ath power of said product window, wherein $0<A<1$, means for generating a window-weighted sample block by weighting a block of said signal samples with said window function, subband means for generating frequency subband information in response to said window-weighted sample block, and means for representing said frequency subband information in a form suitable for transmission or storage.

11. An apparatus according to claim 10 wherein said subband means applies either a filter bank or a transform to said window-weighted sample block.

12. An apparatus for reproducing a signal represented by encoded information, and decoder comprising means for obtaining a window function, wherein said window function is a synthesis window within an analysis-/synthesis-window pair, each of length N, and the product of both windows in said pair is a product window of length N with an overlap interval V, said product window when overlapped with a shifted replica of itself sums to a constant value across the overlap interval, said window function obtained by (1) generating an initial window having a length of $1+V$, (2) generating an interim window by convolving said initial window with a unit pulse function of length $N-V$, (3) defining a scaling factor by convolving said initial window with a unit pulse function of length one, (4) obtaining said product window by dividing said interim window by said scaling factor, and (5) obtaining said window function by taking the Sth power of said product window, wherein $0<S<1$, means for receiving said encoded information and extracting frequency subband information therefrom, subband means for generating a signal sample block in response to said frequency subband information, and means for weighing said signal sample block with said window function.

13. An apparatus according to claim 12 wherein said subband means applies either an inverse filter bank or an inverse transform to said frequency subband information.

14. An apparatus according to claim 10 or 12 wherein said initial window is selected from the set of Kaiser-Bessel windows, Dolph-Chebyshev windows, and windows derived from finite impulse filter coefficients using the Parks-McClellan method.

15. An apparatus according to claim 10 or 12 wherein said subband means has a frequency response characteristic with a passband, a stopband and transition band between said passband and said stopband.

16. An apparatus according to claim 15 wherein steepness of transition band rolloff is maximized for a given depth of stopband rejection.

17. An apparatus according to claim 15 wherein steepness of transition band rolloff substantially follows the lower slope of the human auditory system's psychoacoustic masking threshold.

18. An apparatus according to claim 15 wherein depth of stopband rejection is substantially equal to or less than the human auditory system's psychoacoustic masking threshold.

19. An apparatus for encoding a signal comprising signal samples, said encoder comprising means for generating a window-weighted sample block by weighting a block of said signal samples with a window function, wherein said window function is an analysis window within an analysis-/synthesis-window pair, each of length N, and the product of both windows in said pair is a product window of length N with an overlap interval V, said product window when overlapped with a shifted replica of itself sums to a constant value across the overlap interval, wherein said analysis-/synthesis-window pair is prederived by (1) generating an initial window having a length of $1+V$, (2) generating an interim window by convolving said initial window with a unit pulse function of length $N-V$, (3) defining a scaling factor by convolving said initial window with a unit pulse function of length one, (4) obtaining said product window by dividing said interim window by said scaling factor, and (5) obtaining said window function by taking the Ath power of said product window, wherein $0<A<1$, a filter bank generating subband signals in response to said window-weighted sample block, and means for representing said subband signals in a form suitable for transmission or storage.

20. An apparatus for reproducing a signal represented by encoded information, said decoder comprising means for receiving said encoded information and extracting frequency subband information therefrom, an inverse filter bank generating a signal block in response to said frequency subband information, and means for weighting said signal sample block with a window function, wherein said window function is a synthesis window within an analysis-/synthesis-window pair, each of length N, and the product of both windows in said pair is a product window of length N with an overlap interval V, said product window when overlapped with a shifted replica of itself sums to a constant value across the overlap interval, wherein said analysis-/synthesis-window pair is prederived by (1) generating an initial window having a length of $1+V$, (2) generating an interim window by convolving said initial window with a unit pulse function of length $N-V$, (3) defining a scaling factor by convolving said initial window with a unit pulse function of length one, (4) obtaining said product window by dividing said interim window by said scaling factor, and (5) obtaining said window function by taking the Sth power of said product window, wherein $0<S<1$.

* * * * *

UNITED STATES PATENT AND TRADEMARK OFFICE
CERTIFICATE OF CORRECTION

PATENT NO. : 5,357,594
DATED : October 18, 1994
INVENTOR(S) : Louis Fielder

It is certified that error appears in the above-indentified patent and that said Letters Patent is hereby corrected as shown below:

Column 1 line 41 of the patent, "stiffer" should be --suffer--;

Column 6, line 66 of the patent, "teed back" should be --feedback--;

Column 9, line 6 of the patent, "tier" should be --for--;

Column 15, line 21 of the patent, "bc" should be --be--;

Column 16, line 27 of the patent, "frown" should be --from--;

UNITED STATES PATENT AND TRADEMARK OFFICE
CERTIFICATE OF CORRECTION

PATENT NO. : 5,357,594
DATED : October 18, 1994
INVENTOR(S) : Louis Fielder

It is certified that error appears in the above-indentified patent and that said Letters Patent is hereby corrected as shown below:

Column 22, line 45 of the patent, "and" should be --said--;

Column 23, line 7 of the patent, "weighing" should be --weighting--;

Column 24, line 21 of the patent, --sample-- should be inserted after "signal".

Signed and Sealed this

Twenty-fourth Day of December, 1996

Attest:

BRUCE LEHMAN

Attesting Officer      Commissioner of Patents and Trademarks